(12) United States Patent
Nielsen et al.

(10) Patent No.: US 8,290,215 B2
(45) Date of Patent: *Oct. 16, 2012

(54) VIRTUAL WHITE LINES FOR DELIMITING PLANNED EXCAVATION SITES

(75) Inventors: Steven E. Nielsen, North Palm Beach, FL (US); Curtis Chambers, Palm Beach Gardens, FL (US)

(73) Assignee: Certusview Technologies, LLC, Palm Beach Gardens, FL (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/239,366

(22) Filed: Sep. 26, 2008

(65) Prior Publication Data

US 2009/0241045 A1    Sep. 24, 2009

Related U.S. Application Data

(63) Continuation of application No. 12/050,555, filed on Mar. 18, 2008, now Pat. No. 8,249,306.

(51) Int. Cl.
*G06K 9/00* (2006.01)

(52) U.S. Cl. ........................................ 382/109; 382/115

(58) Field of Classification Search .................. 382/106, 382/112, 113; 715/764
See application file for complete search history.

(56) References Cited

U.S. PATENT DOCUMENTS

| | | |
|---|---|---|
| 4,550,376 A | 10/1985 | Maciejczak |
| 5,032,989 A | 7/1991 | Tornetta |
| 5,414,462 A | 5/1995 | Veatch |
| 5,519,809 A | 5/1996 | Husseiny et al. |
| 5,557,515 A | 9/1996 | Abbruzzese et al. |
| 5,699,244 A | 12/1997 | Clark, Jr. et al. |
| 5,815,411 A | 9/1998 | Ellenby et al. |
| 5,937,406 A | 8/1999 | Balabine et al. |
| 5,961,569 A | 10/1999 | Craport et al. |

(Continued)

FOREIGN PATENT DOCUMENTS

EP    1003241 B1    2/1984

(Continued)

OTHER PUBLICATIONS

Blue Stakes of Utah Utility Notification Center, Inc., Association Newsletter, vol. 1, No. 1, 8 pages, Nov. 1, 2005.

(Continued)

*Primary Examiner* — Chan S Park
*Assistant Examiner* — Nancy Bitar
(74) *Attorney, Agent, or Firm* — Foley & Lardner LLP; Joseph Teja, Jr.

(57) ABSTRACT

Methods and apparatus for facilitating detection of a presence or an absence of at least one underground facility within a dig area. Data representing an aerial image of a geographic area including the dig area is electronically received, the data including geo-coding or geographical identification metadata associated with the aerial image. At least a portion of the aerial image is displayed on a display device, including at least one map symbol, street name, region, and/or landmark description superimposed upon or displayed separately from the geographic area. The dig area is delimited on the displayed image, via a user input device associated with the display device, so as to generate a marked-up digital image including a delimited dig area. Information relating to the marked-up digital image is electronically transmitted and/or electronically stored so as to facilitate the detection of the presence or the absence of the at least one underground facility within the dig area.

18 Claims, 9 Drawing Sheets

U.S. PATENT DOCUMENTS

| | | | |
|---|---|---|---|
| 5,987,380 A | 11/1999 | Backman et al. | |
| 6,075,481 A | 6/2000 | Eslambolchi et al. | |
| 6,101,087 A | 8/2000 | Sutton et al. | |
| 6,169,517 B1 | 1/2001 | Eslambolchi et al. | |
| 6,195,922 B1 | 3/2001 | Stump | |
| 6,298,446 B1 | 10/2001 | Schreiber et al. | |
| 6,343,290 B1 | 1/2002 | Cossins et al. | |
| 6,401,051 B1 | 6/2002 | Merriam | |
| 6,426,872 B1 | 7/2002 | Sutton et al. | |
| 6,434,258 B2 | 8/2002 | Wiens | |
| 6,445,334 B1 | 9/2002 | Bradley | |
| 6,493,650 B1 | 12/2002 | Rodgers et al. | |
| 6,501,501 B1 | 12/2002 | Miyazawa | |
| 6,587,851 B1 | 7/2003 | Ditcharo et al. | |
| 6,650,293 B1 | 11/2003 | Eslambolchi et al. | |
| 6,710,741 B2 | 3/2004 | Tucker | |
| 6,751,552 B1 | 6/2004 | Minelli | |
| 6,751,553 B2 | 6/2004 | Young et al. | |
| 6,751,554 B1 | 6/2004 | Asher et al. | |
| 6,772,142 B1 | 8/2004 | Kelling et al. | |
| 6,798,379 B2 | 9/2004 | Tucker et al. | |
| 6,853,905 B2 | 2/2005 | Barton | |
| 6,895,356 B2 | 5/2005 | Brimhall et al. | |
| 6,898,525 B1 | 5/2005 | Minelli | |
| 6,904,361 B1 | 6/2005 | Tallman et al. | |
| 6,956,524 B2 | 10/2005 | Tucker et al. | |
| 6,958,690 B1 | 10/2005 | Asher et al. | |
| 6,972,698 B2 | 12/2005 | Deguchi | |
| 6,999,021 B2 | 2/2006 | Taylor, Jr. et al. | |
| 7,003,138 B2 | 2/2006 | Wilson | |
| 7,054,741 B2 | 5/2006 | Harrison et al. | |
| 7,133,802 B2 | 11/2006 | Koch et al. | |
| 7,142,196 B1 | 11/2006 | Connor et al. | |
| 7,171,389 B2 | 1/2007 | Harrison | |
| 7,216,034 B2 | 5/2007 | Vitikainen et al. | |
| 7,262,797 B2 * | 8/2007 | Weldum et al. | 348/231.3 |
| 7,313,759 B2 | 12/2007 | Sinisi | |
| 7,356,406 B2 | 4/2008 | Harrison et al. | |
| 7,447,509 B2 | 11/2008 | Cossins et al. | |
| 7,469,247 B2 | 12/2008 | Cossins et al. | |
| 7,482,973 B2 | 1/2009 | Tucker et al. | |
| 7,626,496 B1 | 12/2009 | Asher et al. | |
| 7,640,105 B2 * | 12/2009 | Nielsen et al. | 701/484 |
| 7,773,095 B1 | 8/2010 | Badrak et al. | |
| 8,045,995 B2 * | 10/2011 | King et al. | 455/456.1 |
| 2001/0004739 A1 | 6/2001 | Sekiguchi et al. | |
| 2002/0078035 A1 | 6/2002 | Frank et al. | |
| 2002/0124177 A1 | 9/2002 | Harper | |
| 2002/0184235 A1 | 12/2002 | Young et al. | |
| 2003/0012411 A1 | 1/2003 | Sjostrom | |
| 2003/0061211 A1 | 3/2003 | Shultz et al. | |
| 2003/0131251 A1 | 7/2003 | Fetkovich | |
| 2004/0006425 A1 | 1/2004 | Wood et al. | |
| 2004/0030706 A1 | 2/2004 | Evans | |
| 2004/0110515 A1 | 6/2004 | Blumberg et al. | |
| 2004/0128215 A1 | 7/2004 | Florance | |
| 2004/0210370 A1 | 10/2004 | Gudat et al. | |
| 2005/0033513 A1 | 2/2005 | Gasbarro | |
| 2005/0038999 A1 | 2/2005 | Pelly | |
| 2005/0262109 A1 | 11/2005 | Alexandrescu | |
| 2005/0273346 A1 | 12/2005 | Frost | |
| 2006/0026020 A1 | 2/2006 | Waite et al. | |
| 2006/0077095 A1 * | 4/2006 | Tucker et al. | 342/357.08 |
| 2006/0085133 A1 * | 4/2006 | Young et al. | 702/5 |
| 2006/0085396 A1 | 4/2006 | Evans et al. | |
| 2006/0125828 A1 | 6/2006 | Harrison | |
| 2006/0161349 A1 | 7/2006 | Cross et al. | |
| 2006/0200305 A1 | 9/2006 | Sheha et al. | |
| 2006/0208927 A1 | 9/2006 | Poor et al. | |
| 2006/0276985 A1 | 12/2006 | Xu | |
| 2006/0282280 A1 | 12/2006 | Stotz et al. | |
| 2006/0285152 A1 | 12/2006 | Skillen | |
| 2007/0112936 A1 | 5/2007 | Harrison | |
| 2007/0143676 A1 | 6/2007 | Chen | |
| 2007/0187574 A1 | 8/2007 | Lia | |
| 2007/0195011 A1 | 8/2007 | Hatori et al. | |
| 2007/0219722 A1 * | 9/2007 | Sawyer et al. | 702/1 |
| 2007/0223803 A1 | 9/2007 | Shindo | |
| 2007/0226004 A1 | 9/2007 | Harrison | |
| 2008/0013940 A1 | 1/2008 | Jung | |
| 2008/0021863 A1 * | 1/2008 | Evans et al. | 707/1 |
| 2008/0189249 A1 | 8/2008 | Petakov et al. | |
| 2008/0228294 A1 * | 9/2008 | Nielsen et al. | 700/58 |
| 2008/0245299 A1 | 10/2008 | Nielsen et al. | |
| 2008/0310721 A1 | 12/2008 | Yang | |
| 2009/0013928 A1 | 1/2009 | Nielsen et al. | |
| 2009/0174768 A1 | 7/2009 | Blackburn et al. | |
| 2009/0201178 A1 | 8/2009 | Nielsen et al. | |
| 2009/0201311 A1 | 8/2009 | Nielsen et al. | |
| 2009/0202101 A1 | 8/2009 | Nielsen et al. | |
| 2009/0202110 A1 | 8/2009 | Nielsen et al. | |
| 2009/0202111 A1 | 8/2009 | Nielsen et al. | |
| 2009/0202112 A1 | 8/2009 | Nielsen et al. | |
| 2009/0204238 A1 | 8/2009 | Nielsen et al. | |
| 2009/0204466 A1 | 8/2009 | Nielsen et al. | |
| 2009/0204614 A1 | 8/2009 | Nielsen et al. | |
| 2009/0204625 A1 | 8/2009 | Nielsen et al. | |
| 2009/0207019 A1 | 8/2009 | Nielsen et al. | |
| 2009/0208642 A1 | 8/2009 | Nielsen et al. | |
| 2009/0210098 A1 | 8/2009 | Nielsen et al. | |
| 2009/0210284 A1 | 8/2009 | Nielsen et al. | |
| 2009/0210285 A1 | 8/2009 | Nielsen et al. | |
| 2009/0210297 A1 | 8/2009 | Nielsen et al. | |
| 2009/0210298 A1 | 8/2009 | Nielsen et al. | |
| 2009/0237408 A1 | 9/2009 | Nielsen et al. | |
| 2009/0238414 A1 | 9/2009 | Nielsen et al. | |
| 2009/0238415 A1 | 9/2009 | Nielsen et al. | |
| 2009/0238416 A1 | 9/2009 | Nielsen et al. | |
| 2009/0238417 A1 | 9/2009 | Nielsen et al. | |
| 2009/0241045 A1 | 9/2009 | Nielsen et al. | |
| 2009/0241046 A1 | 9/2009 | Nielsen et al. | |
| 2009/0324815 A1 | 12/2009 | Nielsen et al. | |
| 2009/0327024 A1 | 12/2009 | Nielsen et al. | |
| 2010/0006667 A1 | 1/2010 | Nielsen et al. | |
| 2010/0010862 A1 | 1/2010 | Nielsen et al. | |
| 2010/0010863 A1 | 1/2010 | Nielsen et al. | |
| 2010/0010882 A1 | 1/2010 | Nielsen et al. | |
| 2010/0010883 A1 | 1/2010 | Nielsen et al. | |
| 2010/0033684 A1 | 2/2010 | Thiebaud | |
| 2010/0084532 A1 | 4/2010 | Nielsen et al. | |
| 2010/0085054 A1 | 4/2010 | Nielsen et al. | |
| 2010/0085185 A1 | 4/2010 | Nielsen et al. | |
| 2010/0085376 A1 | 4/2010 | Nielsen et al. | |
| 2010/0085694 A1 | 4/2010 | Nielsen et al. | |
| 2010/0085701 A1 | 4/2010 | Nielsen et al. | |
| 2010/0086671 A1 | 4/2010 | Nielsen et al. | |
| 2010/0086677 A1 | 4/2010 | Nielsen et al. | |
| 2010/0088031 A1 | 4/2010 | Nielsen et al. | |
| 2010/0088032 A1 | 4/2010 | Nielsen et al. | |
| 2010/0088134 A1 | 4/2010 | Nielsen et al. | |
| 2010/0088135 A1 | 4/2010 | Nielsen et al. | |
| 2010/0088164 A1 | 4/2010 | Nielsen et al. | |
| 2010/0090700 A1 | 4/2010 | Nielsen et al. | |
| 2010/0090858 A1 | 4/2010 | Nielsen et al. | |
| 2010/0091200 A1 | 4/2010 | Vigouroux | |
| 2010/0094553 A1 | 4/2010 | Nielsen et al. | |
| 2010/0117654 A1 | 5/2010 | Nielsen et al. | |
| 2010/0188088 A1 | 7/2010 | Nielsen et al. | |
| 2010/0188215 A1 | 7/2010 | Nielsen et al. | |
| 2010/0188216 A1 | 7/2010 | Nielsen et al. | |
| 2010/0188245 A1 | 7/2010 | Nielsen et al. | |
| 2010/0188407 A1 | 7/2010 | Nielsen et al. | |
| 2010/0189312 A1 | 7/2010 | Nielsen et al. | |
| 2010/0189887 A1 | 7/2010 | Nielsen et al. | |
| 2010/0198663 A1 | 8/2010 | Nielsen et al. | |
| 2010/0201690 A1 | 8/2010 | Nielsen et al. | |
| 2010/0201706 A1 | 8/2010 | Nielsen et al. | |
| 2010/0205031 A1 | 8/2010 | Nielsen et al. | |
| 2010/0205032 A1 | 8/2010 | Nielsen et al. | |
| 2010/0205195 A1 | 8/2010 | Nielsen et al. | |
| 2010/0205264 A1 | 8/2010 | Nielsen et al. | |
| 2010/0205536 A1 | 8/2010 | Nielsen et al. | |
| 2010/0205554 A1 | 8/2010 | Nielsen et al. | |
| 2010/0205555 A1 | 8/2010 | Nielsen et al. | |
| 2010/0228588 A1 | 9/2010 | Nielsen et al. | |
| 2010/0245086 A1 | 9/2010 | Nielsen et al. | |
| 2010/0247754 A1 | 9/2010 | Nielsen et al. | |

| | | | |
|---|---|---|---|
| 2010/0253511 A1 | 10/2010 | Nielsen et al. | |
| 2010/0253513 A1 | 10/2010 | Nielsen et al. | |
| 2010/0253514 A1 | 10/2010 | Nielsen et al. | |
| 2010/0255182 A1 | 10/2010 | Nielsen et al. | |
| 2010/0256825 A1 | 10/2010 | Nielsen et al. | |
| 2010/0256863 A1 | 10/2010 | Nielsen et al. | |
| 2010/0256912 A1 | 10/2010 | Nielsen et al. | |
| 2010/0256981 A1 | 10/2010 | Nielsen et al. | |
| 2010/0257029 A1 | 10/2010 | Nielsen et al. | |
| 2010/0257477 A1 | 10/2010 | Nielsen et al. | |
| 2010/0259381 A1 | 10/2010 | Nielsen et al. | |
| 2010/0259414 A1 | 10/2010 | Nielsen et al. | |
| 2010/0262470 A1 | 10/2010 | Nielsen et al. | |
| 2010/0262670 A1 | 10/2010 | Nielsen et al. | |
| 2010/0263591 A1 | 10/2010 | Nielsen et al. | |
| 2010/0268786 A1 | 10/2010 | Nielsen et al. | |
| 2010/0285211 A1 | 11/2010 | Nielsen et al. | |
| 2010/0318401 A1 | 12/2010 | Nielsen et al. | |
| 2010/0318402 A1 | 12/2010 | Nielsen et al. | |
| 2010/0318465 A1 | 12/2010 | Nielsen et al. | |
| 2010/0324967 A1 | 12/2010 | Nielsen et al. | |
| 2011/0007076 A1 | 1/2011 | Nielsen et al. | |
| 2011/0020776 A1 | 1/2011 | Nielsen et al. | |
| 2011/0022433 A1 | 1/2011 | Nielsen et al. | |
| 2011/0035245 A1 | 2/2011 | Nielsen et al. | |
| 2011/0035251 A1 | 2/2011 | Nielsen et al. | |
| 2011/0035252 A1 | 2/2011 | Nielsen et al. | |
| 2011/0035260 A1 | 2/2011 | Nielsen et al. | |
| 2011/0035324 A1 | 2/2011 | Nielsen et al. | |
| 2011/0035328 A1 | 2/2011 | Nielsen et al. | |
| 2011/0040589 A1 | 2/2011 | Nielsen et al. | |
| 2011/0040590 A1 | 2/2011 | Nielsen et al. | |
| 2011/0045175 A1 | 2/2011 | Nielsen et al. | |
| 2011/0046993 A1 | 2/2011 | Nielsen et al. | |
| 2011/0046994 A1 | 2/2011 | Nielsen et al. | |
| 2011/0046999 A1 | 2/2011 | Nielsen et al. | |
| 2011/0060496 A1 | 3/2011 | Nielsen et al. | |
| 2011/0060549 A1 | 3/2011 | Nielsen et al. | |
| 2011/0095885 A9 | 4/2011 | Nielsen et al. | |
| 2011/0131081 A1 | 6/2011 | Nielsen et al. | |
| 2011/0135163 A1 | 6/2011 | Nielsen et al. | |
| 2011/0137769 A1 | 6/2011 | Nielsen et al. | |
| 2011/0236588 A1 | 9/2011 | Nielsen et al. | |
| 2011/0279229 A1 | 11/2011 | Nielsen et al. | |
| 2011/0279230 A1 | 11/2011 | Nielsen et al. | |
| 2011/0279476 A1 | 11/2011 | Nielsen et al. | |
| 2011/0282542 A9 | 11/2011 | Nielsen et al. | |
| 2011/0283217 A1 | 11/2011 | Nielsen et al. | |
| 2011/0285749 A1 | 11/2011 | Nielsen et al. | |
| 2012/0019380 A1 | 1/2012 | Nielsen et al. | |
| 2012/0036140 A1 | 2/2012 | Nielsen et al. | |
| 2012/0058751 A1 | 3/2012 | Colley | |

FOREIGN PATENT DOCUMENTS

| | | |
|---|---|---|
| JP | 2005327228 | 11/2005 |
| JP | 2006189930 | 7/2006 |

OTHER PUBLICATIONS

Blue Stakes of Utah Utility Notification Center, Inc., Association Newsletter, vol. 1, No. 2, 5 pages, Jul. 15, 2006.
Blue Stakes of Utah Utility Notification Center, Inc., Association Newsletter, vol. 3, No. 1, 7 pages, Nov. 2007.
Blue Stakes of Utah Utility Notification Center, Inc., Association Newsletter, vol. 5, No. 1, 7 pages, Dec. 2009.
DigSafely New York, i-Notice, http://www.ufpo.org/excv/Inotice/, (original publication date unknown), printed Jun. 5, 2010, 4 pages.
Eastern Virginia Damage Prevention Committee, Meeting Minutes, Mar. 26, 2009 and May 12, 2009, 6 pages.
Fredericksburg Area Damage Prevention Committee, Meeting Minutes, Dec. 2009.
Georgia UPC EDEN, Web Entry Instruction Manual, www.gaupc.org, Jan. 22, 2009, 60 pages.
GPS Technology Enhancing Underground Utility Locating, Underground Construction Magazine, Apr. 2010, 3 pages.
Illinois One-Call System, NEWTIN Remote Ticket Entry User's Manual, Jun. 12, 2007, 29 pages.
IRTH Internet Manual, Arizona Bluestake, Call Before you Dig, http://www.azbluestake.com/main/download/IRTHNetFeatures.pdf, (original publication date unknown), 47 pages.
IRTH Internet Manual, Georgia Utilities Protection Center, Feb. 16, 2006, 20 pages.
IRTH One Call Centers, Underground Utility Damage Prevention, Ticket Management, http://www.irth.com/SOLUTIONS/IRTH_ONE_CALL/index.aspx, (original publication date unknown), 2 pages.
Letter from Norfield Data Products to Wolf Greenfield & Sacks, P.C., May 5, 2010, 2 pages.
North Carolina One-Call Center, Newtin Remote Ticket Entry Application Tutorial, Sep. 17, 2009, 24 pages.
North Carolina One-Call Center, Newtin Remote Ticket Entry Quick Map Tutorial, Nov. 2008, 13 pages.
NTDPC One-Call Mapping Notification Processes, http://www.ntdpc.com/ntdpc/faces/ntscf.jsp, (original publication date unknown), 12 pages.
Utility Notification Center of Colorado, Annual Report for Fiscal Year 2004, 41 pages.
Utility Notification Center of Colorado, Annual Report for Fiscal Year 2005, 39 pages.
Utility Notification Center of Colorado, Annual Resort for Fiscal Year 2006, 49 pages.
Utility Notification Center of Colorado, Annual Report for Fiscal Year 2007, 44 pages.
Utility Notification Center of Colorado, Annual Report for Fiscal Year 2008, 39 pages.
Virginia Pilot Project for One-call Location Technology, Project Plan, Aug. 2006, 28 pages.
International Search Report and Written Opinion, Application Serial No. PCT/2010/000131, Apr. 23, 2010.
Common Ground Alliance, Best Practices Version 1.0, Apr. 2003.
Common Ground, Study of One-Call Systems and Damage Prevention Best Practices, Aug. 1999.
Virginia Pilot Project, Incorporating GPS Technology to Enhance One-Call Damage Prevention, Phase I—Electronic White Lining Project Report, Nov. 2007, 50 pages.
Blue Stakes of Utah Utility Notification Center, Inc., Association Newsletter, vol. 4, No. 1, pp. 1-8, Nov. 2008.
http://www.al1call.com/rte_proc.html, printed Apr. 14, 2009, 1 page (original publication date unknown).
Alabama 1 Call, GeoRemote, Remote Ticket Entry Manual, 35 pages, printed from website http://www.al1call.com on Apr. 2, 2009 (original publication date unknown).
Alabama 1 Call, Annual Operations Report, 2005, 32 pages, printed from website http://www.al1call.com on Apr. 2, 2009 (original publication date unknown).
Co-Pending U.S. Appl. No. 12/050,555, filed Mar. 18, 2008.
Co-Pending U.S. Appl. No. 12/239,414, filed Sep. 26, 2008.
Co-Pending U.S. Appl. No. 12/355,222, filed Jan. 16, 2009.
Co-Pending U.S. Appl. No. 12/355,272, filed Jan. 16, 2009.
Co-Pending U.S. Appl. No. 12/355,300, filed Jan. 16, 2009.
Co-Pending U.S. Appl. No. 12/475,924, filed Jun. 1, 2009.
Co-Pending U.S. Appl. No. 12/475,935, filed Jun. 1, 2009.
Co-Pending U.S. Appl. No. 12/475,956, filed Jun. 1, 2009.
Co-Pending U.S. Appl. No. 12/475,905, filed Jun. 1, 2009.
Co-Pending U.S. Appl. No. 12/366,853, filed Feb. 6, 2009.
Co-Pending U.S. Appl. No. 12/422,364, filed Apr. 13, 2009.
Co-Pending U.S. Appl. No. 12/422,372, filed Apr. 13, 2009.
"Case Study: Wireless mash-up keeps track of Vegas' pipes," TechWorld, http://howto.techworld.com/mobile-wireless/2297/case-study-wireless-mash-up-keeps tra..., printed Dec. 16, 2009 (original publication date unknown), 2 pages.
Gopher State One Call—History and Background, http://www.gopherstateonecall.org/history.aspx, printed on Dec. 12, 2009 (original publication date unknown), 2 pages.
Gopher State One Call—Virtual Polygon Fact Sheet, http://www.gopherstateonecall.org/docs/Virtual%20Polygon%20Fact%20Sheet.pdf, printed on Dec. 16, 2009 (original publication date unknown), 4 pages.

Hanneman, J., "Notification and the NMOC Map System," http://nmonecall.org/articles.htm, printed on Dec. 16, 2009 (original publication date unknown), 10 pages.
International Search Report and Written Opinion, Application Serial No. PCT/US2009/01707, May 14, 2009, 13 pages.
One Call Concepts Inc.—Company News & Executive Profiles, BNET Industries, http://resources.bnet.com/topic/one_call+concepts+inc..html, printed on Dec. 15, 2009 (original publication date unknown), 6 pages.
One Call Concepts Inc.—Prism Software, http://www.occinc.com/services/prism_software.asp, printed on Dec. 16, 2009 (original publication date unknown), 1 page.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Pickus, J., "Call USA—Automating "Call Before You Dig" Processes for a Major Utility," GITA's Annual Conference on Apr. 25-28, 2004, 19 pages.
Pickus, J., "Internet GIS for the Municipality," Las Vegas Water District, http://spatialnews.geocomm.com/geonetcom/seminar3.html, printed Dec. 16, 2009 (original publication date unknown), 3 pages.
Schutzberg, A., "Autodesk Positions Itself for 2008 and Beyond," Location Intelligence Articles, Feb. 22, 2008, http://www.locationintelligence.net/articles/2693.html, printed Dec. 16, 2009, 4 pages.
Stocking, A., "Betting on Technology," Mar. 2007, http://www.resources.autodesk.com/files/government/customer_stories/A137-LVTBVWD_Municipal_Sewer_and_Water article.pdf, 3 pages.
Utility Notification Center—Membership Details, http://www.callbeforeyoudig.org/himember.htm, printed on Dec. 12, 2009 (original publication date unknown), 12 pages.
Office Action dated Mar. 1, 2012 from U.S. Appl. No. 12/475,924.
Office Action dated Mar. 12, 2012 from U.S. Appl. No. 12/355,272.
Office Action dated Mar. 13, 2012 from U.S. Appl. No. 12/422,372.
Binder 1 "Virginia Utility Protection Service, Inc. Response to US Patent Application Publication . . . " pp. DY0001-DY0755, Nov. 3, 2010.
R. Pevarski, Letter from the Virginia Utility Protection Service, Inc., dated Apr. 7, 2010.
H.L. Smith Letter dated Oct. 27, 2010.
H.L. Smith, Letter dated Jan. 14, 2011, with two attachments each dated Jan. 5, 2011.
Notice of Allowance dated Dec. 27, 2011 from U.S. Appl. No. 13/028,687.
Office Action dated Feb. 14, 2012 from U.S. Appl. No. 12/833,103.
U.S. Appl. No. 13/028,687, filed Feb. 16, 2011, Nielsen et al.
U.S. Appl. No. 12/833,103, filed Jul. 9, 2010, Nielsen et al.
Australian Dial Before You Dig User Kit, http://1100.com.au/Portals/0/pdf/DBYD_user_kit_2010.pdf, original publication date unknown, retrieved Sep. 7, 2011, 24 pages.
CGA, Common Ground Alliance, Best Practices, Version 4.0, Mar. 2007, 102 pages.
Chmura, A., "Professional Excavators Enter Tickets Easily through i-dig," Ohio Call Center, summer 2011, 3 pages.
England & Wales beforeUdig Users Manual v 1.0.0, www.beforeudig.com.uk, original publication date unknown, retrieved Sep. 7, 2011, 22 pages.
Iowa One Call, Design Request System Tutorial, http://docs.google.com/viewer?a=v&pid=explorer&chrome=true&srcid=0Bzflsq-1kKARMzJjYTBjZDEtNTJiYy00YTJmLThjZjMtY2FkZjfzZWNhNDZi&hl=en&authkey=Clq6zKAN. original publication date unknown, retrieved Nov. 16, 2011, 32 pages.
IRTHNet GIS, http://www.irth.com/index.php?option=com_content&view=article&id=id=90&Itemid=73, 2010, printed Jul. 30, 2010, 1 page.
ITIC, A guide to using the ITIC system, New Jersey One Call Concepts, Inc., http://www.nj1-call.org/docs/NJ%20ITIC%20Manual.pdf, original publication date unknown, retrieved Nov. 16, 2011, 33 pages.
Kansas One Call Excavator Newsletter, fall 2006, 4 pages, http://www.kansasonecall.com/excavators/newsletter/.
Kansas One Call Excavator Newsletter, winter 2005, 4 pages, http://www.kansasonecall.com/excavators/newsletter/.
New Zealand beforeUdig Users Manual, http://www.beforeudig.co.nz/images/stories/beforeudig%20online%20system%20update%20v.1.1.pdf, original publication date unknown, retrieved Sep. 7, 2011, 3 pages.
Notice of Allowance dated Nov. 15, 2011 from U.S. Appl. No. 13/028,687.
Office Action dated Aug. 5, 2011 from U.S. Appl. No. 12/475,935.
Office Action dated Sep. 29, 2011 from U.S. Appl. No. 12/355,222.
Office Action dated Sep. 29, 2011 from U.S. Appl. No. 12/366,853.
Office Action dated Oct. 3, 2011 from Canadian Application No. 2,718,877.
Office Action dated Oct. 18, 2011 from U.S. Appl. No. 12/355,272.
Office Action dated Nov. 7, 2011 from U.S. Appl. No. 12/422,364.
Office Action dated Nov. 8, 2011 from U.S. Appl. No. 12/050,555.
Office Action dated Nov. 9, 2011 from U.S. Appl. No. 12/239,414.
Office Action dated Nov. 10, 2011 from U.S. Appl. No. 12/355,300.
Office Action dated Oct. 5, 2011 from U.S. Appl. No. 12/422,372.
Office Action dated Sep. 14, 2011 from U.S. Appl. No. 12/475,924.
One Call Concepts Locating Services, Inc., Point Positive Utility Mapping & GIS, http://www.occls.com/Default.aspx?content=pointpositive, original publication date unknown, retrieved Sep. 21, 2011, 1 page.
Pelican Corp., beforeUdig mobile, http://pelicancorp.com/index.php?option=com_content&view=article&id=145&Itemid=133, orginal publication date unknown, printed Aug. 30, 2011, 1 page.
Pelican Corp., DigSAFE OneCall Key Capabilities, http://www.pelicancorp.com/index.php?option=com_content&view=article&id=104&Itemid=121, original publication date unknown, printed Aug. 30, 2011, 2 pages.
Pelican Corp., DigSAFE Pro Automated Plan Response Server, http://www.pelicancorp.com/index.php?option=com_content&view=article&id=48&Itemid=68, original publication date unknown, printed Aug. 30, 2011, 2 pages.
Pelican Corp., DigSAFE Pro Automation Workflow, http://www.pelicancorp.com/index.php?option=com_content&view=article&id=119&Itemid=124, original publication date unknown, printed Aug. 30, 2011, 2 pages.
Pelican Corp., DigSAFE Pro New and Updated Features for version 2.4, http://www.pelicancorp.com/index.php?option=com_content&view=article&id=151&Itemid=91, original publication date unknown, printed Aug. 30, 2011, 2 pages.
Pelican Corp., How beforeUdig works, http://www.pelicancorp.com/index.php?option=com_content&view=article&id=114&Itemid=105, original publication date unknown, printed Aug. 30, 2011, 1 page.
Pelican Corp., Using beforeUdig, http://www.pelicancorp.com/index.php?option=com_content&view=article&id=115&Itemid=106, original publication date unknown, printed Aug. 30, 2011, 1 page.
Schall, G. et a., "Virtual Redlining for Civil Engineering in Real Environments," IEEE International Symposium on Mixed and Augmented Reality Sep. 15-18, 2008, Cambridge, UK, 4 pages.
Singapore beforeudig Frequently Asked Questions, http://www.beforeudig.com.sg/index.php?option=com_content&view=article&id=9&Itemid=10, original publication date unknown, retrieved Nov. 28, 2011, 2 pages.
USA North, "Damage Prevention Update," Jun. 2011 Newsletter, http://www.usanorth.org/2011JuneFinal.pdf, 4 pages.
Alabama One Call, untitled screenshots with descriptive callouts, Oct. 13, 2010, 3 pages.
Bernhardsen, T., "Georgraphic Information Systems," 2007, http://onlinelibrary.wiley.com.
Claim Chart, 160 pages.
Claim Chart, 206 pages.
Corrected Notice of Allowability dated Jun. 8, 2012 from U.S. Appl. No. 12/366,853.
GeoCall MapSearch, Alabama One Call, screen shot, 1 page. (claim 31).
GeoCall MapSearch, Alabama One Call, screen shot, 1 page. (claim 34).

GeoCall MapSearch, screenshot with descriptive callout boxes, (original publication date unknown), 1 page.
GeoCall MapSearch, screenshot with descriptive callout boxes, (original publication date unknown), 2 pages.
GeoCall V2—This is a the [sic] master compiled list of changes made to GeoCall listed by build number, no date, 5 pages.
Marking Tools, descriptive origin and screenshot, received Apr. 2012 (original publication date unknown), 2 pages.
Notice of Allowability dated Jun. 8, 2012 from U.S. Appl. No. 12/355,222.
Notice of Allowance dated Apr. 11, 2012 from U.S. Appl. No. 12/355,222.
Notice of Allowance dated May 8, 2012 from U.S. Appl. No. 12/366,853.
OCARS Pro Gemini Ticket Entry, Miss Dig System, Manual, Jun. 2, 2003, 37 pages.
Office Action dated Mar. 26, 2012 from U.S. Appl. No. 12/422,364.
Office Action dated Mar. 28, 2012 from U.S. Appl. No. 12/475,956.
Office Action dated Apr. 2, 2012 from Canadian Application No. 2,718,877.
Office Action dated Apr. 16, 2012 from U.S. Appl. No. 12/475,935.
Office Action dated May 3, 2012 from U.S. Appl. No. 12/050,555.
Office Action dated May 4, 2012 from U.S. Appl. No. 12/239,414.
Office Action dated May 24, 2012 from U.S. Appl. No. 12/355,300.
Office Action dated Jun. 8, 2012 from U.S. Appl. No. 12/475,905.
Pennsylvania OneCall Prior Art, Pennsylvania One Call Systems, Inc., Report, 15 pages, Mar. 2012.
Pennsylvania OneCall Prior Art, Pennsylvania One Call Systems, Inc., Report, 5 pages, Mar. 2012.
Pennsylvania OneCall Prior Art, Pennsylvania One Call Systems, Inc., Report, 6 pages, Mar. 2012.
Proposed Implementation of Mapping Changes to GeoCall, no date, 2 pages, Mar. 2012.
Rigaux, P., "Spatial Databases," 2002, http://books.google.com, Apr. 2002.
Saf-Call One Call Solutions that Work, received Apr. 2012 (original publication date unknown), PowerPoint, 23 pages.
Ticket 121070070 Test01 Ticket, dated Apr. 16, 2012, print, 1 page.
Webopedia—What is a Database, http://www.webopedia.com/TERM/D/database.html, original publication date unknown, retrieved Apr. 24, 2012.
Welcome to Virginia Locate Technology Pilot, Virginia Utility Protection Service, Inc., PowerPoint, received Apr. 2012 (original publication date unknown), 93 pages.

* cited by examiner

VIRTUAL WHITE LINES FOR DELIMITING PLANNED EXCAVATION SITES

CROSS-REFERENCE TO RELATED APPLICATIONS

This patent application is a continuation of U.S. application Ser. No. 12/050,555, filed in the U.S. Patent and Trademark Office on Mar. 18, 2008 by Nielsen et al., the entire contents of which is incorporated herein by reference in its entirety.

BACKGROUND

1. Technical Field

The present disclosure generally relates to the field of delimiting excavation sites, and more particularly, using aerial imagery and white line mark-ups for delimiting a dig area where excavation is planned and providing the marked-up version of the aerial image, via an electronic or tangible delivery system, to another entity.

2. Description of the Related Art

Excavators are required to notify underground facility owners/operators in advance of their excavation activities and to describe and communicate the geographic area of those activities to underground facility owners/operators. The geographic area so described is commonly referred to as "the dig area." In turn, facility owners/operators are required to determine if they own or operate any underground facilities at an identified dig area. The presence of underground facilities at a dig area is generally detected using a device commonly referred to as a "locate wand." Locate wands use a number of electronic methods to detect the presence of underground facilities. The presence of those underground facilities, if any, which exist within a dig area is marked using paint or some other physical marking system, such as flags. Paint is generally applied as a sequence of dashes or dots on the surface (grass, dirt, asphalt, concrete, etc.) above the underground facility and is color-coded to indicate to the excavator the type (e.g., gas, water, sewer, power, telephone, cable television, etc.) of the underground facility present. Flags, which also may identify the underground facility using color-coding, can be placed in the ground above the underground facility being marked. Paint and/or flags can be dispensed using various devices. The application of paint, flags, or some other marking object to indicate the presence of an underground facility is called a "locate" or "locate operation." The marks, for example, paint or flags, resulting from a locate are commonly called underground facility "locate marks."

Currently, excavators may communicate with facility owners through "one-call centers." These one-call centers are generally owned, controlled, or funded by underground facility owners, such as telephone companies, cable television multiple system operators, electric utilities, gas utilities, or others. One-call center operations may be managed by a non-profit entity or outsourced to a for-profit firm. Excavators are required to notify one-call centers in advance of their excavation activities and identify through a "locate request" the dig area where individual excavating activities will be performed. Locate requests consist of information supplied by the excavator to the one-call center regarding the specific geographic location of the dig area, date, time, purpose of excavation, and so on. The locate request, in turn, requires activity from an underground facility owner to perform a locate operation in the specified dig area.

One-call centers may receive locate requests from excavators via electronic delivery or verbally through a telephone conversation between the excavator and a human operator working for a one-call center. Whether communicated electronically or verbally, excavators must describe the planned geographic locations of the proposed dig areas. This description is ultimately reduced to text, which, along with other data about a locate request, is communicated to the appropriate underground facility owner or owners responsible for locating any underground facilities within the dig area so described. Textual descriptions of dig areas can be very imprecise as to exact physical locations. In addition, addresses, which are provided, may be unclear, not yet assigned or only indicate cross streets and vague descriptions of the location of the dig area.

On occasion, information provided in the locate request is supplemented by the excavator, who travels to the actual dig area and physically marks the dig area in order to physically delimit the actual area to be excavated. These marks are commonly made using chalk or paint, and are generally known as "white lines." In some states, the responsible regulatory body may require white lining the path of excavation.

SUMMARY

An image data of the present disclosure is provided. The image data includes at least one image including a geographic location. A portion of the geographic location indicates a dig area.

In another aspect of the present disclosure, a ticket is provided. The ticket includes a data set associated with a geographic location. The ticket also includes a at least one image including the geographic location, a portion of the geographic location indicating a dig area.

In another aspect of the present disclosure, a system is provided. The system includes an excavator, a provider of locate operations, and a dig area associated with at least one image.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION OF EXEMPLARY EMBODIMENTS

The following detailed description refers to the accompanying figures. The same reference numbers in different figures may identify the same or similar elements. In addition, the following detailed description does not limit the present disclosure.

Figure 1:
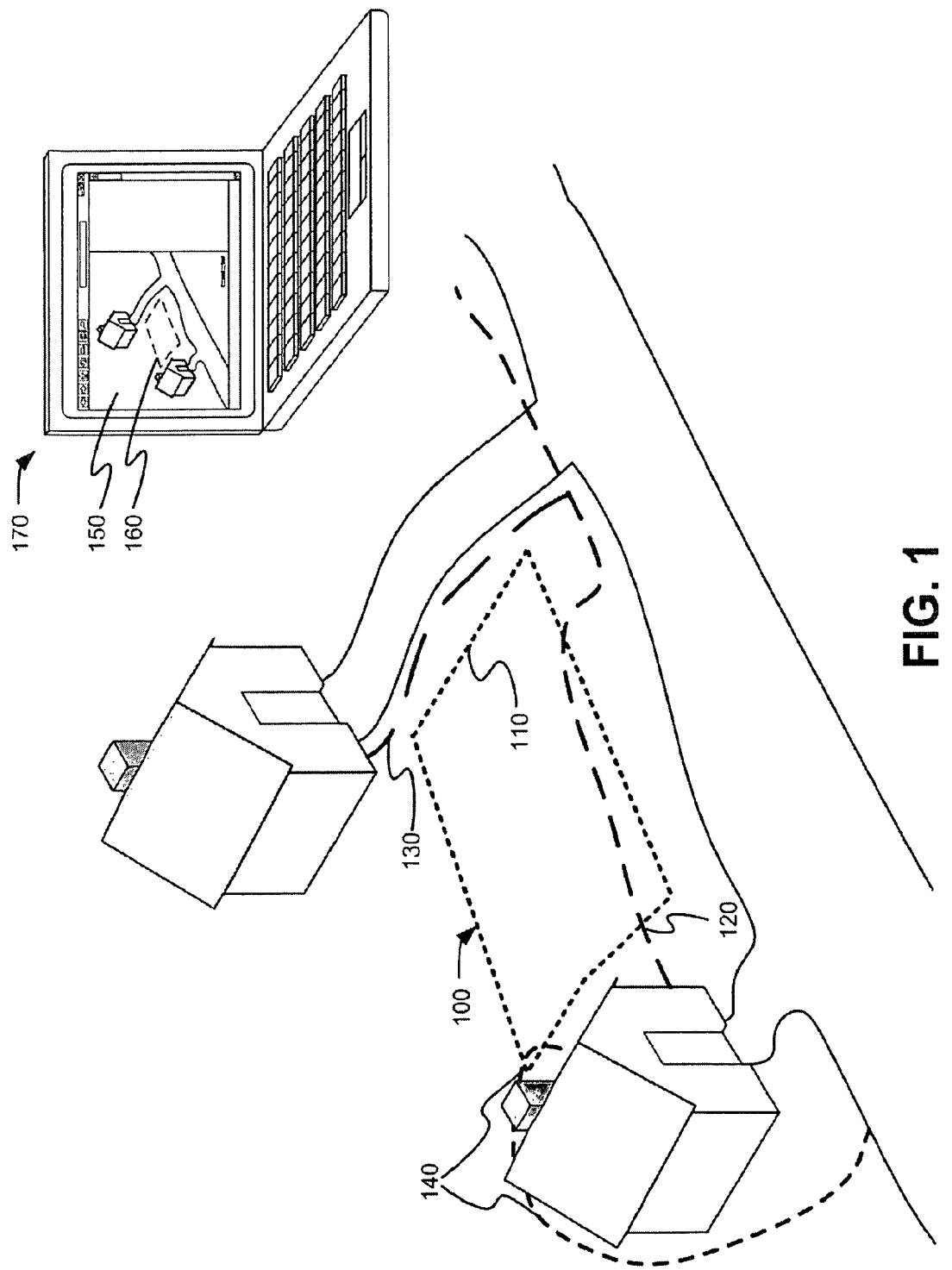
FIG. 1 is a diagram of the white line delimiting concept described herein.

Turning now to FIG. 1, a diagram of an exemplary concept as described herein is shown. When a locate request is submitted by an excavator to a one-call center, it may be beneficial for the excavator to delimit the particular geographic location of the proposed excavation, such as a dig area 100, in a permanent and reproducible manner. The delimited dig area 100 indicates to a locate technician the extent of the boundaries where a locate is to be performed at the request of the excavator. Physical white lines 110 may be used to physically delimit dig area 100. Physical white lines 110 generally may consist of chalk or paint on the surface of the ground to identify the dig area 100 boundary. However, these physical white lines 110 provide only a temporary indication of dig area 100, as physical white lines 110 may deteriorate or be eliminated over time by certain events such as precipitation, excessive pedestrian or vehicle traffic, erosion, the excavation process, or numerous other events.

In the example of FIG. 1, a locate technician may be requested by an excavator to locate and mark underground facilities in dig area 100. The precise geographic extent of dig area 100 as communicated by the excavator may be uncertain. This uncertainty as to the precise extent of dig area 100 may result in a locate operation that does not address the entirety of the planned excavation site or conversely may result in a locate operation that covers an area in excess of the precise extent of the planned excavation area. When performing the locate operation, the locate technician may use paint, flags or some other object with a particular color or other characteristic to mark the location of an underground facility. Referring to the example shown in FIG. 1, the locate technician may be required to mark a portion of underground power line 120 that lies within dig area 100. However, the locate technician may not be required to mark the portion of underground power line 120 that lies outside dig area 100 or telecommunications lines 130 and 140 that lie outside the dig area 100. As shown in FIG. 1, telecommunication line 140 traverses a small portion of dig area 100. Without a precise and certain description of dig area 100, the small portion of telecommunication line 140 within dig area 100 may not be located by the locate technician as the technician may believe that the presence of telecommunication line 140 is not of interest to the excavator. Thus, it is important that the locate technician is provided a clear and accurate boundary of dig area 100 to avoid, for example, an excavator later digging over an unmarked underground facility. Physical white lines 110 placed by the excavator and/or descriptive text provided by the one-call center may be used to delimit dig area 100. However, as noted above, these methods may lack permanency, accuracy or certainty.

An aerial image 150 is shown as displayed on a laptop computer 170. The aerial image provides a view of the geographic area surrounding dig area 100. Implementations described herein enable excavators to delimit, on aerial images of the earth, the specific dig areas where planned excavations will be performed. As used herein, an "aerial image" is intended to be broadly interpreted as any image taken from above the earth's surface, such as, for example, images generated using a satellite, airplane, helicopter or other moving or fixed device. These aerial images may be indexed to Global Positioning System (GPS) coordinates or other coordinates that provided geo-spatial positioning. The aerial images may include geo-coding or other geographical identification metadata and may be provided in any computer-readable format. The aerial image may also include images of map symbols, such as roads and street names, that may be superimposed upon or displayed separately from an underlying geographic area.

Virtual white lines 160 may be added to the aerial image 150 to graphically delimit dig area 100. Virtual white lines 160 may be added to aerial image 150 using a drawing application, or dig area marking tool application, which may superimpose over or otherwise display virtual white lines 160 on the aerial image 150. As used herein "virtual white lines" may include lines, drawing shapes, shades, points, symbols, coordinates, data sets, or other indicators to delimit on an aerial image the dig area in which excavation is to occur.

The exemplary embodiments described herein may additionally communicate to the underground facility owner the images, which indicate the boundary of the dig area both graphically and as a series of geographical coordinates. These images and coordinates enable locate technicians who are dispatched to locate the existing underground facilities to know with precision the dig area in which excavating activities are planned to occur regardless of whether physical white lines exist or whether a description of the area has been accurately provided. Implementations described herein may give excavators the ability to provide one-call centers with virtual white lines as part of a locate request. Other implementations may provide virtual white lines to facility owners subsequent to the initial locate request to the one-call center.

Use of virtual white lines, as described herein, eliminates the uncertainty associated with imprecise excavator locate requests. This ensures that underground facility owners determine the presence of their underground facilities within a correctly communicated and certain dig area and mark the location of their facilities where excavators in fact plan to excavate. The precision and permanency of virtual white lines may reduce the occurrence of underground facilities not being marked within a dig area. In addition, use of virtual white lines may result in less field communication between excavators and locate technicians about imprecise dig area descriptions and may reduce confusion about the exact location of a dig area. Confusion about precise dig area locations may result in costly damages to underground facilities, which may imperil the public. When excavators inadvertently excavate at locations where underground facility owners have not located existing underground facilities, damages to underground facilities are highly likely. Additionally, in jurisdictions where excavators are required to physically "white line" the dig area, implementations described herein may enable excavators (if they so choose and are permitted to do so) to identify the dig area boundaries with precision without being required to physically visit the site. The digital description of the dig area, on an aerial image generated by exemplary embodiments described herein, also creates a permanent record of the dig area that is associated with each locate request by an excavator.

Figure 2:
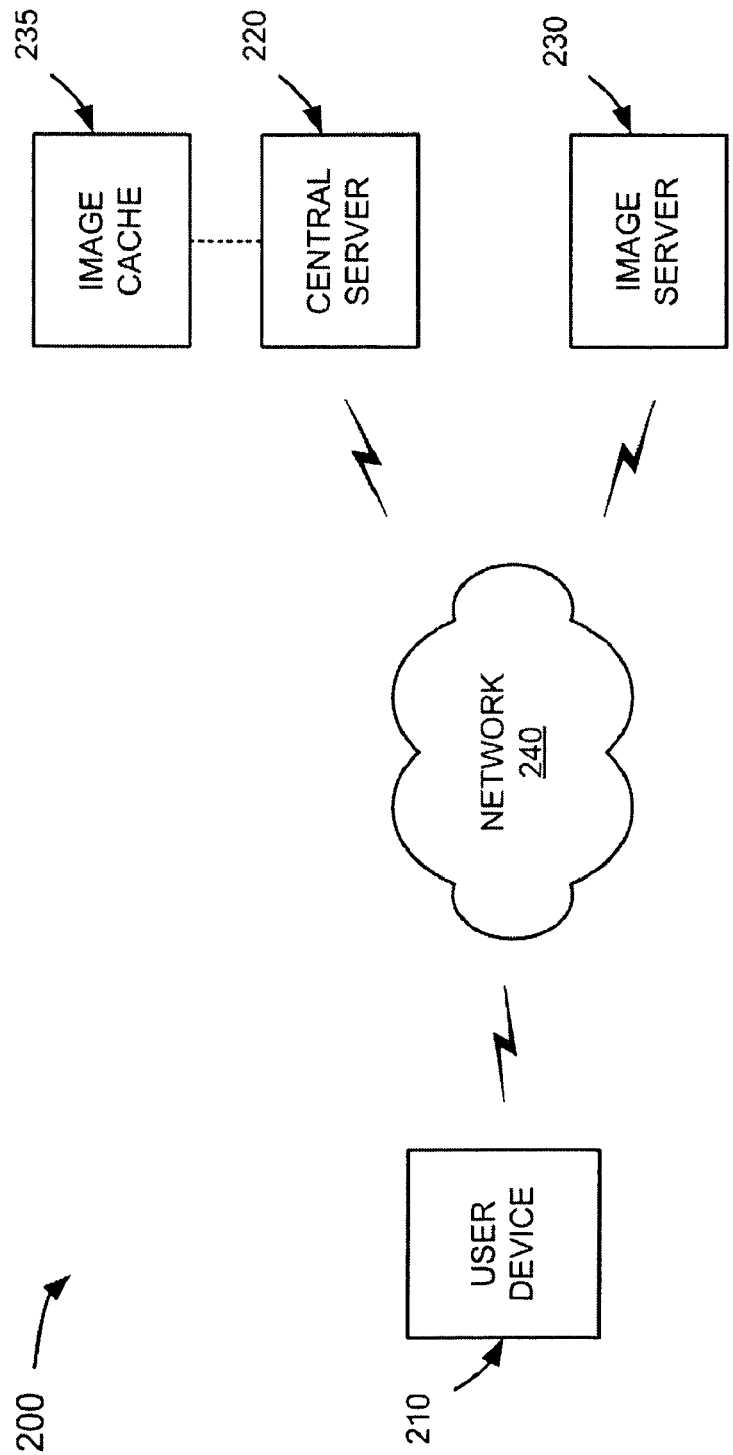
FIG. 2 is a diagram of an exemplary network in which systems and methods described herein may be implemented.

Turning now to FIG. 2, there is a diagram of an exemplary network 200 in which systems and methods described herein may be implemented. As shown in FIG. 2, a network 200 may include a user device 210 connected to a central server 220 and an image server 230 via a network 240. Single user device 210, central server 220 and image server 230 have been illustrated as connected to network 240 for simplicity. In practice, there may be more or fewer user devices and/or servers. For example, in one alternative implementation, user device 210 may operate as a comprehensive device and, thus, the network 200 may include no central server, with user device 210 communicating directly through network 240 to image server 230. In addition, in some instances, the user device 210 may perform one or more of the functions of central server 220 and/or central server 220 may perform one or more of the functions of the user device 210. In still another implementation, multiple user devices 210 may be connected to central server 220 through network 240.

User device 210 may encompass a computer device, such as laptop computer 170, a personal computer, a tablet device, a personal digital assistant (PDA), a cellular radiotelephone, a mobile computing device, a touch-screen device, a touchpad device, or generally any device including, or connected to, a processor and a display. The user device 210 may be portable to be separately carried by the user at a prospective dig area. Alternatively, user device 210 may be integrated with or affixed to another moveable object, such as a vehicle. In other implementations, the user device may be a desktop or laptop computer located at, for example, an office of an excavating company. In another implementation, the user device may be a computer located at the one-call center, to be used by, for example, a one-call center representative or another person present at the one-call center.

Central server 220 may include a computer device that may store information received from or provided to the user device 210 and/or image server 230. The central server may be maintained by, for example, a one-call center. In some implementations, central server 220 may be a web-based server to facilitate a remote interface through, for example, an Internet browsing application on user device 210. Central server 220 may include storage capacity and/or optionally include networked access to one or more separate hardware components, such as image cache 235, to store cached images and the like. Central server may also store applications, such as image drawing applications, that can be accessed by user device 210 to manipulate the cached images.

Image server 230 may include a computer device that may store and provide aerial images of geographic locations. Image server 230 may be associated with the same, or a different, party that maintains the central server 220. For example, image server 230 may be associated with a party that provides aerial images for a fee. Generally, the aerial images provided by the image server may be of sufficient resolution at an optimal elevation to be useful to effectively delimit a dig area on the image. The aerial images from image server 230 may include geocoding or other geographical identification metadata and may be provided in any computer-readable format, such as JPEG file interchange format (JPEG), tagged image file format (TIFF), portable document format (PDF), graphics interchange format (GIF), bitmap (BMP), portable network graphics (PNG), Windows® metafile (WMF), and/or the like. In addition, aerial images from image server 230 may include a combination of images or overlays, such as overlays of street names, regions, landmark descriptions, and/or other information about areas displayed in an image. The aerial images from image server 230 may be supplied by a third-party provider if the coverage area of the third-party image provider overlaps with the desired area of the user.

Network 240 may include a local area network (LAN), a wide area network (WAN), a telephone network, such as the Public Switched Telephone Network (PSTN) or a cellular network, an intranet, the Internet, one or more communications links, or a combination of networks. User device 210, central server 220, and image server 230 may connect to network 240 via wired and/or wireless connections. User device 210, central server 220, and image server 230 may communicate using any communication protocol.

It is contemplated that data transfer and related communications within the present disclosure can be made through wireless interfaces including, for example, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN, Shared Wireless Access Protocol (SWAP), combinations thereof, and other types of wireless networking protocols. Additionally, the wireless interface may be capable of capturing signals that reflect a user's intent by capturing the user's audible statements or commands. Additionally, the wireless interface may interact with a device that monitors a condition or biological state of the user, such as eye movement, brain activity, heart rate, and/or other subtle signals.

Figure 3:
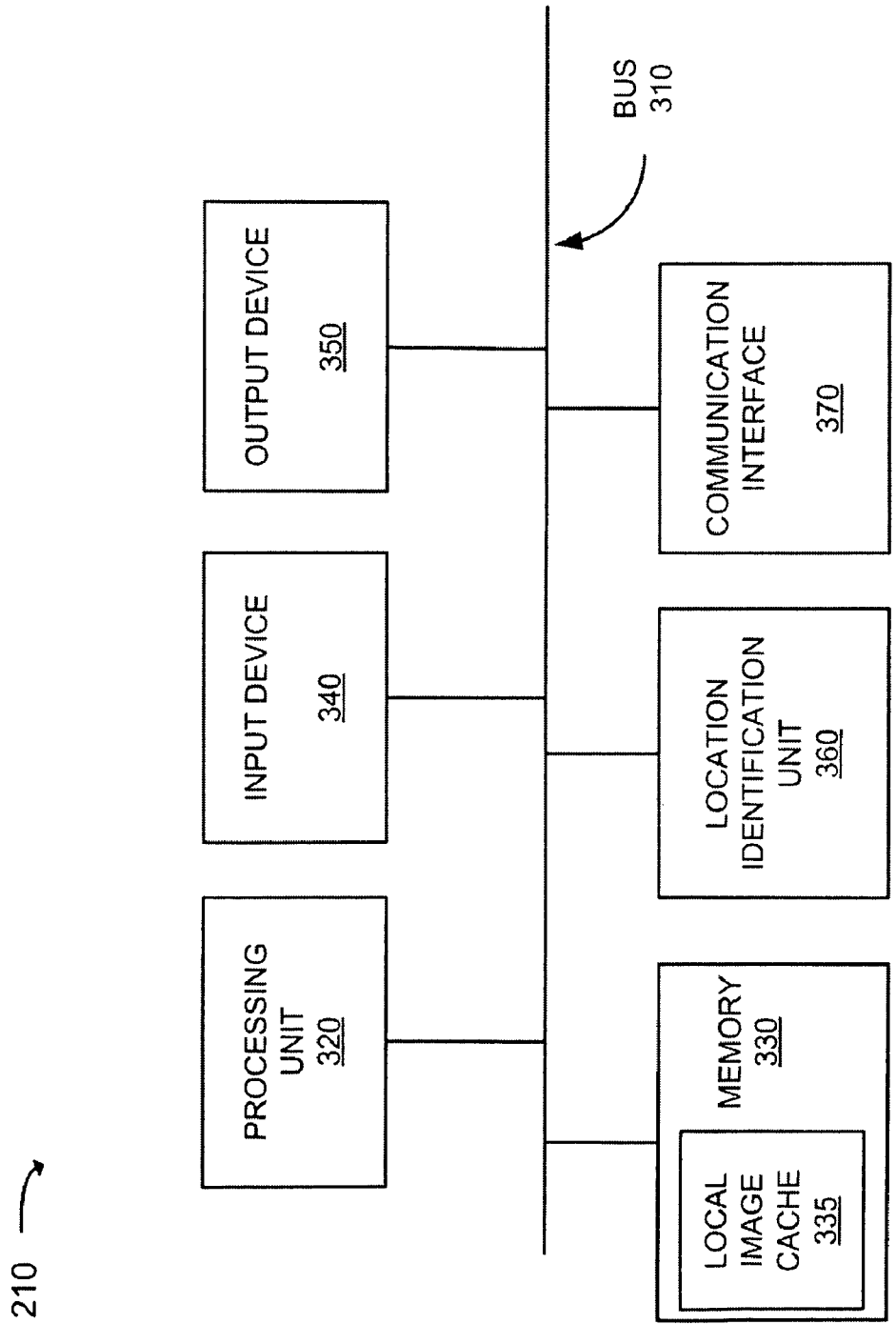
FIG. 3 is a diagram of exemplary components of the network of FIG. 2.

With reference to FIG. 3, a diagram of exemplary components of user device 210 is shown. User device 210 may include a bus 310, a processing unit 320, a memory 330, an input device 340, an output device 350, a location identification unit 360, and a communication interface 370. In another implementation, user device 210 may include more, fewer, or different components. For example, location identification unit 360 may not be included, or location identification unit 360 may be included as a device located external to user device 210, such as a device worn or carried by a user of user device 210.

Bus 310 may include a path that permits communication among the components of user device 210. Processing unit 320 may include a processor, a microprocessor, or processing logic that may interpret and execute instructions. Memory 330 may include a random access memory (RAM), a read only memory (ROM), a memory card, a magnetic and/or optical recording medium and its corresponding drive, or another type of memory device. Generally, memory 330 may be sufficient to store and manipulate aerial images, such as those stored in a local image cache 335. In one implementation, local image cache 335 may include one or more aerial images of a dig area to be marked by a user. In another implementation, local image cache 335 may include a series of aerial images that correspond to the geographical region to which a particular user is assigned. For example, local image cache 335 may include a collection of high-resolution images of a particular zip code or town. In a further implementation, local image cache 335 may include aerial images of previously delimited dig areas, such as dig areas where a user of user device 210 has previously requested locate operations. In still another implementation, local image cache 335 may include an entire set of aerial images intended to be made available to multiple users.

Input device 340 may include one or more mechanisms that permit a user to input information to user device 210, such as a keyboard, a keypad, a touchpad, a mouse, a stylus, a touch screen, a camera, or the like. Alternatively, or additionally, input device 340 may include a microphone that can capture a user's intent by capturing the user's audible commands. Alternatively, or additionally, input device 340 may interact with a device that monitors a condition of the user, such as eye movement, brain activity, or heart rate. Output device 350 may include one or more mechanisms that output information to the user, such as a display, a speaker or the like.

Location identification unit 360 may include a device that can determine its geographic location to a certain degree of accuracy, such as a global positioning system (GPS) or a global navigation satellite system (GNSS) receiver. In another implementation, location identification unit 360 may include a device that determines location using other known techniques, such as tower (e.g., cellular tower) triangularization. Location identification unit 360 may receive location tracking signals (e.g., GPS signals) and determine its location based on these signals. In one implementation, location identification unit 360 may be capable of determining its location within approximately thirty centimeters or less. In another implementation, location identification unit may receive and store location coordinates from an external device.

Communication interface 370 may include any transceiver-like mechanism that enables user device 210 to communicate with other devices and/or systems. For example, communication interface 370 may include mechanisms for communicating with another device or system via network 240. For example, communication interface 370 may enable communications between user device 210 and central server 220 and/or image server 230 over network 240.

As will be described in detail below, user device 210 may perform certain operations relating to the documentation of locate requests and/or the creation of virtual white lines. User device 210 may perform these operations in response to processing unit 320 executing software instructions contained in a computer-readable medium, such as memory 330. A computer-readable medium may be defined as a physical or logical memory device.

The software instructions may be read into memory 330 from another computer-readable medium, or from another device via the communication interface 370. The software instructions contained in memory 330 may cause processing unit 320 to perform other processes as will be described later herein. Alternatively, hardwired circuitry may be used in place of, or in combination with, software instructions to implement processes described herein. Thus, implementations described herein are not limited to any specific combination of hardware circuitry and software.

Figure 4:
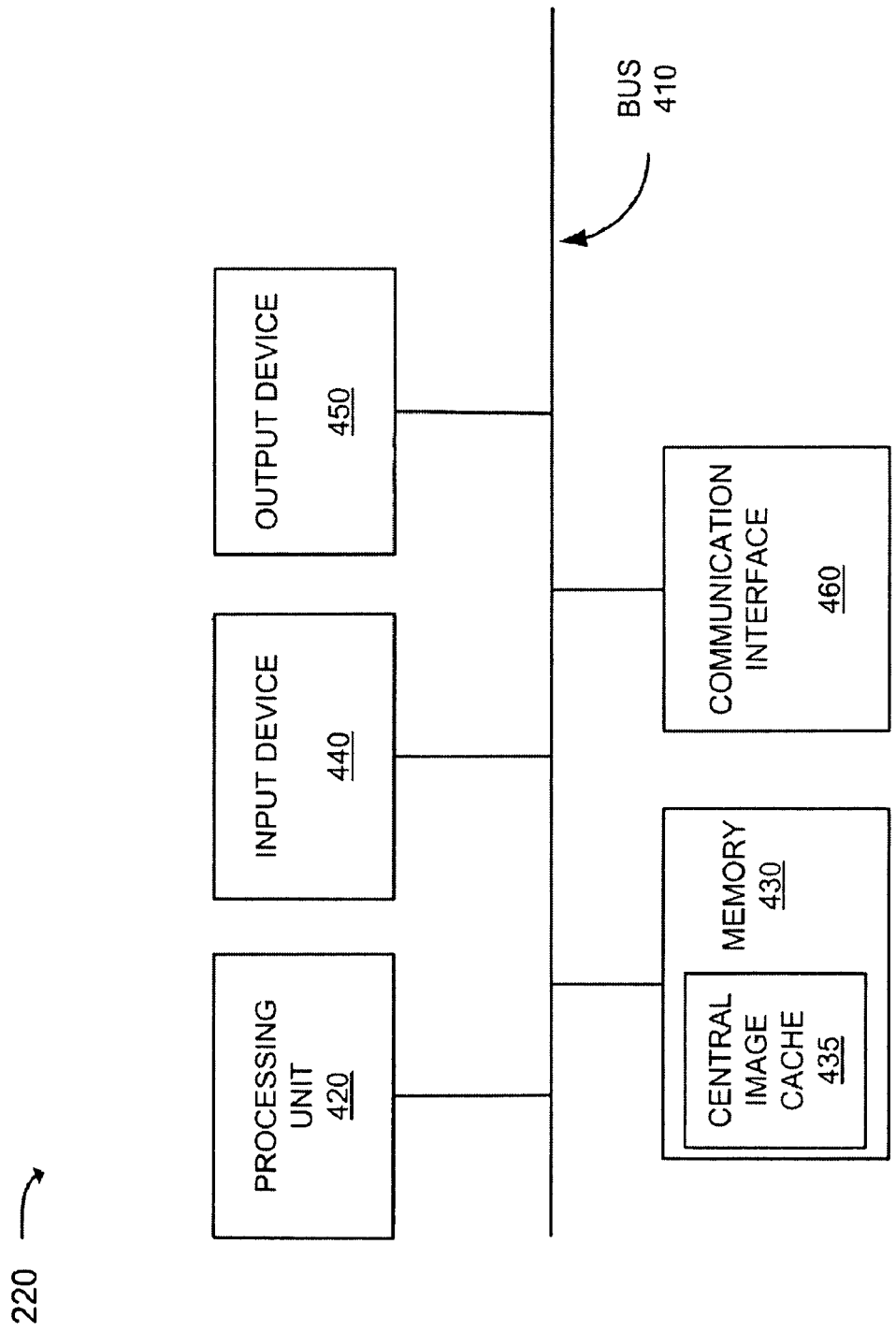
FIG. 4 is a diagram of exemplary components of a central server of FIG. 2.

Turning to FIG. 4, a diagram of exemplary components of central server 220 is shown. Central server 220 may include a bus 410, a processing unit 420, a memory 430, an input device 440, an output device 450, and a communication interface 460. In another implementation, central server 220 may include more, fewer or different components.

Bus 410 may include a path that permits communication among the components of central server 220. Processing unit 420 may include a processor, a microprocessor, or processing logic that may interpret and execute instructions.

Memory 430 may include a magnetic and/or optical recording medium and its corresponding drive, a RAM, a ROM, a memory card, or another type of memory device suitable for high capacity data storage. Generally, memory 430 may be sufficient to store aerial images of particular geographic locations, such as those stored in a central image cache 435. In one implementation, central image cache 435 may include a set of aerial images that correspond to the geographical regions to which a group of users are assigned. In still another implementation, central image cache 435 may include the entire set of aerial images intended to be made available to any of a group of users. For example, central image cache 435 may include a collection of high-resolution aerial images of a particular county, state or other geographic region. In another implementation, as shown in network 200 of FIG. 2, central image cache 435 may be replaced or supplemented with one or more networked storage components, such as image cache 235.

Input device 440, similar to input device 340 of user device 210, may include one or more mechanisms that permit an operator to input information to central server 220. Output device 450 may include one or more mechanisms that output information to an operator of the central server, such as a display, a speaker, or the like.

Communication interface 460 may include any transceiver-like mechanism that enables central server 220 to communicate with other devices and/or systems. For example, communication interface 460 may include mechanisms for communicating with another device or system via network 240. For example, communication interface 460 may enable communications between central server 220 and user device 210 and/or image server 230 over network 240.

As will be described in detail below, central server 220 may perform certain operations to facilitate the documentation of locate requests and/or virtual white lines and to disseminate locate requests (and corresponding virtual white line information) to appropriate locate technicians and/or other parties. Central server 220 may perform these operations in response to processing unit 420 executing software instructions contained in a computer-readable medium, such as memory 430.

The software instructions may be read into memory 430 from another computer-readable medium, or from another device via communication interface 440. The software instructions contained in memory 430 may cause processing unit 420 to perform processes that will be described later. Alternatively, hardwired circuitry may be used in place of or in combination with software instructions to implement processes described herein. Thus, implementations described herein are not limited to any specific combination of hardware circuitry and software.

Figure 5:
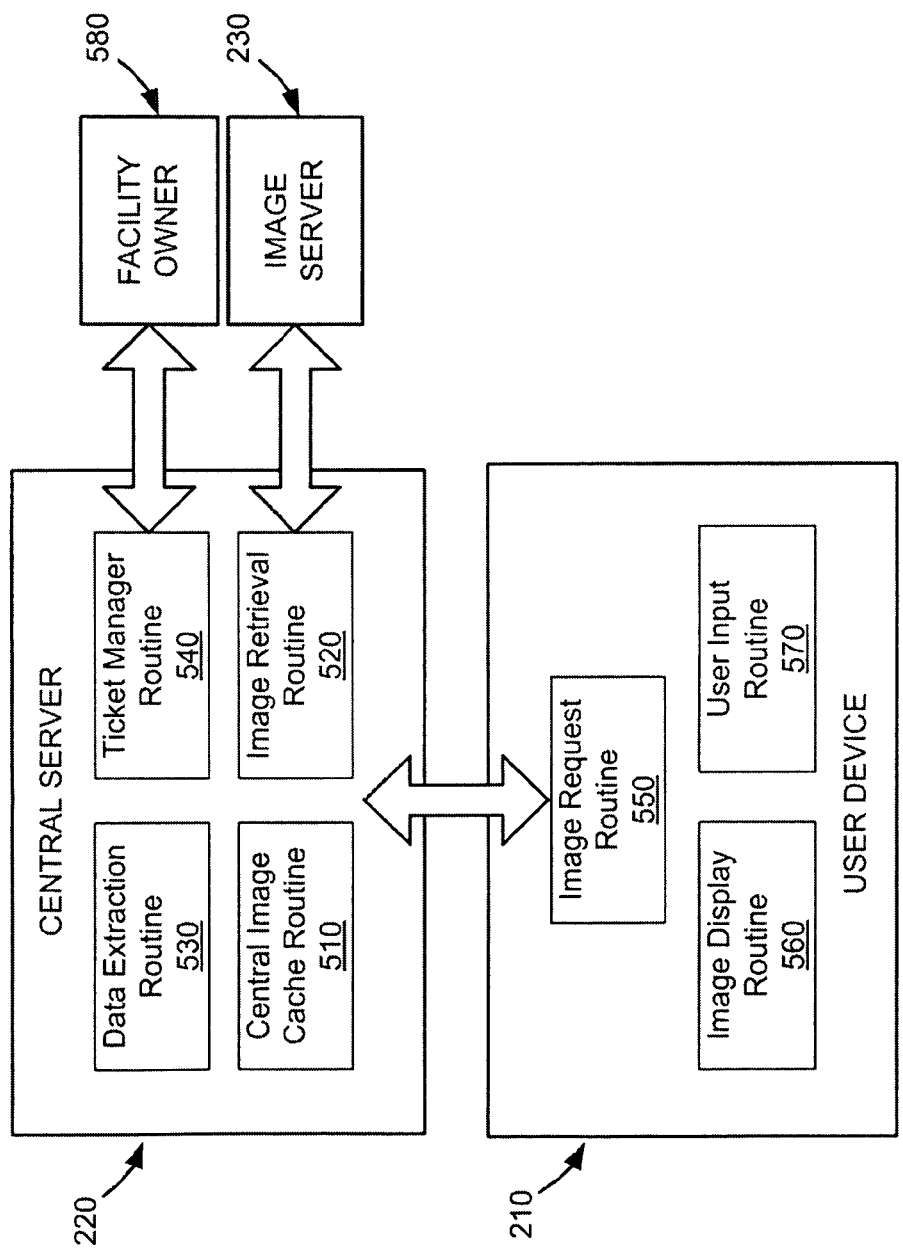
FIG. 5 is a diagram of exemplary routines associated with a user device and/or the central server of FIG. 2.

Turning to FIG. 5, a diagram of exemplary software routines for central server 220 and user device 210 is shown. Central server 220 may include an image retrieval routine 510, a central image cache routine 520, a data extraction routine 530, and a ticket manager routine 540. User device 210 may include an image request routine 550, an image display routine 560, and a user input routine 570. As discussed in more detail herein, the examples of routines associated with central server 220 and user device 210 may be interchangeable between central server 220 and user device 210. Furthermore, some or all of routines 510, 520, 530, 540, 550, 550, 560, and 570 may need not be performed exclusively by any one of central server 220 or user device 210. FIG. 5 indicates communication between user device 210 and facility owner 580 and/or image server 230 as communication passes through central server 220. However, it should be noted that in other implementations facility owner 580 and/or image server 230 may communicate directly with user device 210.

Generally, in one implementation, user device 210 may permit a user, such as an excavator or a person at a one-call center, to receive an aerial image and submit virtual white line information in association with a locate request placed to a one-call center. Central server 220 may permit the one-call center to associate the virtual white line information with the locate request and to provide instructions to a facility owner 580 who is required to conduct a locate. Instructions from the one-call center (via, for example, central server 220) to facility owner 580 may be provided as a compilation of information, called a "locate request ticket." The virtual white line information may be associated with the locate request ticket in the form of, for example, a marked-up aerial image and/or geographic coordinates of the virtual white lines. For the purposes herein, facility owner 580 may be a facility owner, facility operator, or any contracted representative acting on their behalf.

Central image cache routine 510, image retrieval routine 520, data extraction routine 530, and ticket manager routine

540 of central server 220 may include a variety of functionalities. In certain implementations, central image cache routine 510 may receive information about specific locate requests and parse each locate request in order to discern location information. For example, a locate request may identify the property associated with a dig area by an address of the property, a nearby street intersection, or by geographic coordinates. The locate request might also specify, for example, the description of the dig area to be delimited, and the day and/or time that excavations are scheduled to begin.

Central image cache routine 510 may also convert location information for the property associated with the dig area to latitude/longitude coordinates or geo-positioning coordinates. When location information from a locate request is sufficiently precise to allow for identification of corresponding imagery associated with property surrounding a dig area, central image cache routine 510 may calculate the image extent (which may be generally defined as the bounding region of the property of interest), and generate a locate request ticket for the facility owner with the calculated extent. The image extent may, for example, include the coordinates of the corners of the bounding region (e.g., the lower left x and y coordinates and the upper right x and y coordinates). In one implementation, central image cache routine 510 may determine an image date, coordinates, and resolution of each image that may be stored in central image cache 435 or in another location. In another implementation, when location information from a ticket is imprecise (or "fuzzy"), central image cache routine 510 may mark the locate request ticket to indicate that no corresponding image could be retrieved based on the locate request.

Image retrieval routine 520 may catalog and store images from image server 230 to central server 220. For example, images may be stored in central image cache 435 in memory 430 of central server 220. In one implementation, image retrieval routine 520 may query central image cache 435 or other cache for an image associated with a particular planned dig area relating to a locate request, and determine, based on, for example, the age and resolution of the cached image, whether the image in central image cache 435 needs to be updated from image server 230.

In another implementation, image retrieval routine 520 may interface with multiple image providers and/or image servers 230. Image retrieval routine 520 may determine which image provider is the best source for the image corresponding to a particular dig area relating to a locate request based on algorithms that factor, for example, each image provider's geographical coverage, image resolution, cost, and availability. Regarding geographical coverage, it will be beneficial to confirm that the image provider's area of coverage includes the desired extent.

Regarding image resolution, available resolution may be measured in meters (or centimeters, feet, or inches) per pixel. For example, one provider may offer thirty centimeters per pixel, while another offers fifteen centimeters or less per pixel, for the same coverage area. If an image is requested at a standard altitude, then image retrieval routine 520 may choose a pre-defined optimal scale (for example, thirty centimeters per pixel for a rural area, but fifteen centimeters per pixel for an urban area) and determine which provider provides images at the pre-defined optimal scale. Alternatively, if the image of interest is at a less granular scale (for example, a community or neighborhood image that allows the locator to pan around the image), then resolution may not be a significant factor.

Regarding cost, image retrieval routine 520 may have access to pricing information for a variety of image providers. Image retrieval routine 520 may identify which provider has the lowest cost for the desired image. The cost analysis may be based on images desired for an individual ticket or the algorithm may account for a group of image requests, including volume incentives and/or penalties from each image provider.

Regarding availability of image providers, image retrieval routine 520 may identify what providers are available and/or operational. Also, if an image provider has a regular latency profile (for example, if a provider has a particular server that is busiest 3-5 PM Pacific time), then image retrieval routine 520 may manage requests to be provided to another image provider or to a particular server of that image provider to efficiently load share the image retrieval.

When an image provider is selected, image retrieval routine 520 may download the image from the selected image provider's server, which may be image server 230. The downloaded image may be stored locally, for example, in the central image cache 435.

It should be understood that some of the routines and/or functionalities described above with respect to central image cache routine 510 and image retrieval routine 520 may be performed by one or both of the routines 510 and 520 above, and the arrangement of functionalities are not limited to the implementations disclosed herein.

In certain implementations, data extraction routine 530 may obtain geographic coordinates (e.g., Global Positioning System (GPS) coordinates, other geo-positioning coordinates, or latitude and longitude coordinates) based on a marked-up aerial image provided by, for example, user input routine 570 in user device 210. Marked-up aerial images may also include text or other indicators including, for example, text blocks describing the dig area; offsets to environmental landmarks; a locate request ticket number; the address or lot number of the dig area; and/or the date, time, and purpose of the excavation. This additional data may also be extracted from the aerial image and stored as a dataset associated with the marked-up aerial image.

In one implementation, central server 220 may interface with a ticket management program for coordinating multiple locate request tickets and for providing locate request information to a facility owner 580. Ticket manager routine 540 may facilitate such an interface. The ticket management program for coordinating multiple tickets may also reside on central server 220, for example, or on a separate server that is accessible to central server 220. Generally, locate request ticket information may be stored on central server 220 and disseminated to a facility owner 580. When a user submits a locate request, the user may also subsequently submit a set of virtual white lines on an aerial image to associate with the locate request. In another implementation, the user may submit a set of virtual white lines on an aerial image simultaneously with the user's initial locate request. The ticket manager routine 540 may allow the user to update data regarding the locate request and to synchronize the images and user input. Ticket manager routine 540 may send virtual white lines from central server 220 to facility owner 580 for locate request tickets that need to be completed, and will copy the input from facility owner 580 to central server 220 for completed tickets. Ticket manager routine 540 may interface with the routines described above to correlate assigned locate request tickets with images and virtual white lines for those tickets and download the images to facility owner 580 from central server 220.

Referring now to routines in FIG. 5 that may be associated with user device 210, image request routine 550 may solicit information from a user as the basis of an image to associate with a dig area for a locate request. For example, the user input may include a postal address, lot number, plat number, street intersection, a set of GPS coordinates relating to the planned dig area, or the like. The user device may send the location information to central server 220 to allow the central server (via, for example, image retrieval routine 520) to identify a corresponding image.

In one implementation, image request routine 550 may identify an image to retrieve based on GPS coordinates of a GPS-enabled device associated with a user. For example, a user may arrive at an excavation site in a GPS-enabled vehicle and the GPS information from the vehicle may be used to identify coordinates corresponding to an image to be retrieved. GPS coordinates may also be obtained from other GPS-enabled devices being used by or in the vicinity of the user. As used herein, a GPS-enabled device may include any device or combination of devices capable of interfacing with a global navigation satellite system, geo-spatial positioning system, or other location-identification system to determine a location. Examples of GPS-enabled devices may include a marking device (e.g., a paint wand) with an integrated GPS receiver; a locating device (e.g., a locating wand) with a GPS receiver, a wearable GPS-enabled device, a vehicle-mounted GPS system, certain PDAs, computers, and cellular telephones, and stand-alone GPS-enabled systems.

In another implementation, a user may provide a street address or other property identification information. If the street address or other property identification information is insufficient to identify a specific property, image request routine may (by, for example, communicating with central server 220) suggest a list of possible matches or suggest another form of information suitable for identifying the property associated with a planned dig area.

In still another implementation, image request routine 550 may identify one or more images to request based on a designated geographical area assigned to a user. For example, a user may be assigned to work in several dig areas associated with a particular section of a neighborhood. The user may input coordinates associated with the entire selected section of the neighborhood, and central image cache routine 510 and/or image retrieval routine 520 may then retrieve images for those coordinates.

Once an image is loaded from local cache 335 and/or central server 220, image display routine 560 may provide a variety of view options for the user. For example, image display routine 560 may support zooming in and out of the image by changing the image scale. In addition, image display routine 560 may support panning horizontally and vertically in the image. Furthermore, image display routine 560 may support "roaming" outside the boundaries of the initial extent. Roaming generally occurs when the user zooms or pans, such that images beyond the boundaries of the stored images may be required to be retrieved from either local image cache 335 or central server 220. The additional images retrieved from either local image cache 335 or central server 220 may be displayed and stitched together to display a complete image.

User input routine 570 allows the user to add information to the image to delimit a planned dig area. User input routine 570 may accept user input from, for example, input device 340, and may support the addition of lines, freehand forms (or scribbling), shading, drawing shapes such as circles and rectangles, or other markings, which delimit the approximate location of the dig area. As used herein, a drawing shape may generally be any kind of drawing shape or mark. In addition to the delimiting of the dig area on the aerial image, user input routine 570 may also include offsets from environmental landmarks that may be displayed on the image in, for example, English or metric units. Environmental landmarks may also be marked and/or highlighted on the aerial image. An environmental landmark may include any physical object that is likely to remain in a fixed location for an extended period of time. Examples of an environmental landmark may include a tree, a curb, a driveway, a utility pole, a fire hydrant, a storm drain, a pedestal, a water meter box, a manhole lid, a building structure (e.g., a residential or office building), or a light post. For example, an edge of a dig area located two and a half meters behind the curb of a residential street would be documented as being offset two and a half meters behind the curb.

In one implementation, there may be occasions where central server 220 is unable to provide an aerial image to associate with location information for a planned dig area. Instead, user input routine 570 may still be utilized without the underlying aerial image (e.g., a blank grid). For example, the user may use drawing tools in user input routine 570 to sketch environmental landmarks and virtual white lines sufficient to delimit a dig area.

User input routine 570 may also accept positioning information from external sources, such as a GPS-enabled device. In one implementation, where a blank grid is being used, the positioning information may be uploaded to the blank grid to provide, for example, points for relative spacing, proper scale, and dimensioning of a user's sketch.

In another implementation, user device 210 may also communicate with external components to identify geographical positioning coordinates of various points related to a dig area, such as dig area boundaries, environmental landmarks, and the like. Particular coordinates may be stored in a memory of the external device, sent to user device 210, and provided as information on the aerial image using, for example, user input routine 570. The coordinates may appear, for example, as dots on the aerial image that can be connected or labeled by the user using user interface 570.

User input routine 570 may further include features to annotate the image with text and to revise user inputs by, for example deleting, dragging or pasting drawing shapes. In one implementation, when the user zooms the image view in or out, user input (e.g., lines and/or shapes) that have been added to the original image may adhere to the changing image scale and remain in the original user-input locations.

The virtual white lines, which may be a compilation of the aerial image and user inputs, may be saved as an image file. In another implementation, the user inputs may be saved in a marked-up format, including the geo-coordinates of each drawing shape added to the image by the user.

Figure 6:
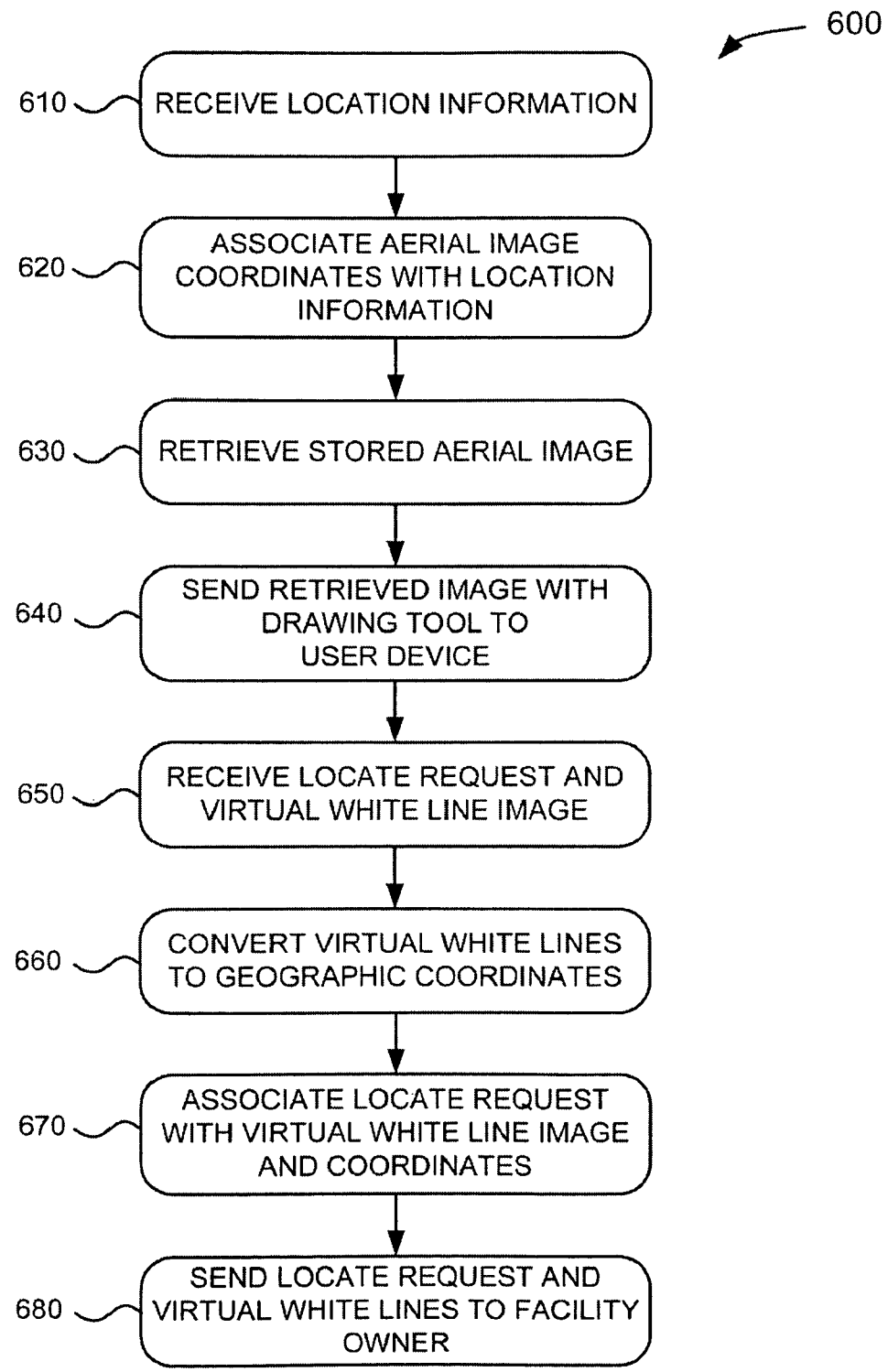
FIG. 6 is a flow diagram of exemplary activities of a central server for managing a locate request.

Turning to FIG. 6, there is provided a flow diagram 600 of exemplary activities of central server 220 for managing a locate request according to an implementation. In another implementation, at least some of the blocks of flow diagram 600 may be performed using user device 210. In another implementation, one or more of the blocks of FIG. 6 may be manually performed or performed by other devices.

Flow diagram 600 may begin, for example, when an excavator contacts a one-call center to place a locate request. The user (e.g., the excavator or a person at the one-call center) may use a computer or other user device 210 to submit the locate request to central server 220. Central server 220 may include, generally, a virtual white line application and image storage service to facilitate locate requests. In one implementation, the user may be required to establish an account with central server 220, which may include providing a login identifier and password. Another implementation may allow for access to central server 220 without an account. As part of the locate request, the user (via user device 210) may provide to central server 220 a geographic location or address associated with a planned dig area. The geographic location or address may be extracted from the locate request, so that the server may receive the dig area location information (block 610).

In block 620, aerial image coordinates may be associated with the geographic location or address information. For example, central server 220 may associate coordinates of an aerial image with the general location of the planned dig area that was provided in the locate request. Such association may include associating the address with geographic location information that has a defined image extent, such as global positioning coordinates for the image extent corresponding to the property address.

In block 630, a stored aerial image associated with the address may be retrieved from a cache of images and provided to the user device 210. As previously described and discussed herein with respect to FIG. 5, the cache of images may reside within central server 220, a separate image server, or another storage device. Central server 220 may determine if the central image cache 435 (or other image cache) already has an aerial image stored for the dig area that corresponds to the calculated image extent. If so, central image cache 435 may return the stored aerial image to central server 220. If central image cache 435 does not have a corresponding aerial image, then a determination may be made whether to obtain an updated image from image server(s) 230.

Central server 200 may send the particular image associated with the address to the user device (block 640). Along with the image, central server 220 may provide a dig area marking tool application to a browser at user device 210. Aspects of drawing virtual white lines with the dig area marking tool application are described further with respect to FIG. 7 below. It should be noted that blocks 610 through 640 may be an iterative process. In addition, if a user does not have a particular address, it may be possible to pan around a high-level (e.g., lower resolution) aerial image to eventually identify a more specific location associated with a planned dig area.

After a user has added virtual white lines and any additional information to the image, the edited image and other information to complete the locate request may be sent from user device 210 and received by central server 220 (block 650). If not previously accomplished by the user device, central server 220 may convert the virtual white lines to geographic coordinates (block 660). More specifically, the central server 220 may determine geographic coordinates (e.g., Global Positioning System (GPS) coordinates or latitude and longitude coordinates) of the dig area based on virtual white lines on the marked-up digital map.

In block 670, central server 220 may associate the locate request with the mark-up image and coordinates of the virtual white lines. Upon receipt of the marked-up aerial image from user device 210, central server 220 may forward the marked-up version of the aerial image to memory 430 (or another memory location) for storing in association with the locate request ticket information. The marked-up aerial image may subsequently be provided to an underground facility owner that will ascertain the location of any underground facilities within or near the dig area. Central server 210 may provide the marked-up aerial image (including geographic coordinates and other locate request information) to the underground facility owner(s) that will perform the underground facility locate operation. The locate request and virtual white lines may be sent to facility owner 580 (block 680). The information may be provided via an electronic or tangible delivery system, which may include, for example, email, a webpage, facsimile, automated telephone service, printer, automated mailing, or other form of communication.

While the flow diagram of FIG. 6 is described in the context of an excavator contacting a one-call center, other implementations may occur in the context of an excavator contacting a facility owner directly to place a locate request. In another implementation, a one-call center may contact a facility owner to transmit a locate request. In still another implementation, the one-call center representative may draft virtual white lines based on input from an excavator.

Figure 7:
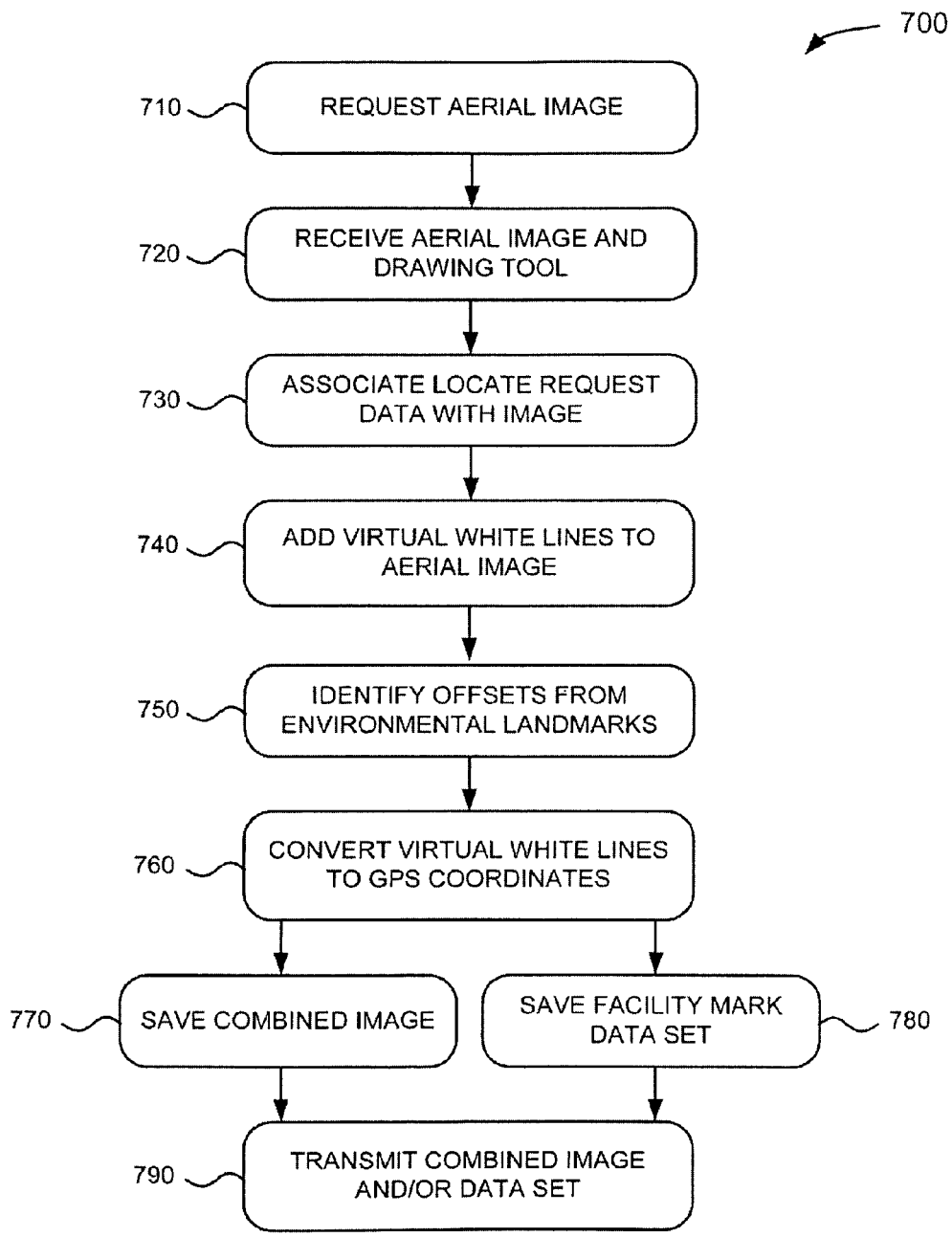
FIG. 7 is a flow diagram of exemplary activities of a user device for submitting a locate request and for adding virtual white lines to an aerial image.

With reference to FIG. 7, there is shown a flow diagram 700 of exemplary activities of user device 210 for submitting a locate request. User device 210 may first request from central server 220 an aerial image that corresponds to an address or other location information for a planned dig area (block 710). In block 720, user device 210 may receive the aerial image and allow a user to confirm that the aerial image properly corresponds to the actual location of the dig area. Along with the image, user device 210 may receive a dig area marking tool application to allow a user to add data to the image. As noted above with respect to FIG. 6, the requesting (block 710) and receiving (block 720) of the aerial image may be an iterative process and may allow for panning a high level-aerial image to identify a particular dig area location.

Once an acceptable image is received at user device 210, user device 210 may associate the locate request data with the aerial image. The locate request data may include, for example, a locate request ticket number, an address of the dig area, and/or the date, time and purpose of the excavation. Some or all of the locate request data may be included as metadata with the aerial image or otherwise associated with the image.

In block 740, virtual white lines may be added to the aerial image that was received previously in block 720. The information about the approximate geographic location of the dig area may be input by the user using the dig area marking tool application and an input device, such as input device 340 (FIG. 3) of user device 210. Additional aspects regarding use of the dig area marking tool are discussed in more detail below with respect to FIG. 9.

Still referring to block 740, information about the approximate geographic location of the dig area may also be received directly from a GPS-enabled device, such as the GPS-enabled locating device or marking device used in block 630, and added to the retrieved image. For example, the approximate geographic location of the physical dig area white lines may be determined by identifying the current geographic location of a GPS-enabled device as it is located at points on the physical white lines of the dig area. In one implementation, the GPS-enabled device may be a marking tool that stores the GPS coordinates of the marking tool as a user applies the physical white lines. The information from the GPS-enabled device may be communicated to user device 210 or central server 220 to be associated with the aerial image. The user may use a combination of received GPS information and manual entries to create virtual white lines for the dig area.

In block 750, information about offsets of the dig area from environmental landmarks may, if necessary, be added to the stored aerial image that was retrieved previously in block 620. As with the input of the virtual white lines in block 640, the location of the environmental landmarks may be input by the user using an input device, such as input device 340 (FIG. 3) of user device 210, or automatically input from a GPS-enabled device. The environmental landmark may be marked and/or labeled as an existing object shown on the aerial image, or the environmental landmark may be a separate item (e.g., not shown on the aerial image) that is added by the user.

The offset information may be automatically calculated or input by the user. Offset information may also be obtained by identifying selected environmental landmarks on the retrieved image and automatically calculating the distance from the selected environmental landmarks to the virtual white lines added to the image.

In block 760, information about the location of the virtual white lines may, if necessary, be converted to GPS coordinates. The location of the virtual white lines and/or landmarks shown on the aerial image may be associated with approximate GPS (or other geographic) coordinates based on the geo-coding of the aerial image. Thus, in some implementations the GPS coordinates of the virtual white lines may be available to approximately delimit the dig area independent of the stored aerial image. In block 770, the retrieved aerial image and information about the location of the virtual white lines may be stored in memory as a single image. The single image may be stored as, for example, a digital image or an interactive electronic map. Additionally or alternatively, in block 780, the geographic coordinates of the virtual white lines may be stored in memory, such as memory 330 (FIG. 3), as a separate data set. The data set may be compiled as, for example, a database of GPS coordinates and other information relevant to the locate request. An exemplary data set of the information that may be provided is described in more detail with respect to FIG. 8. In block 790, the single image and/or separate data set may be transmitted to a central location, such as central server 220 (FIG. 2).

Figure 8:
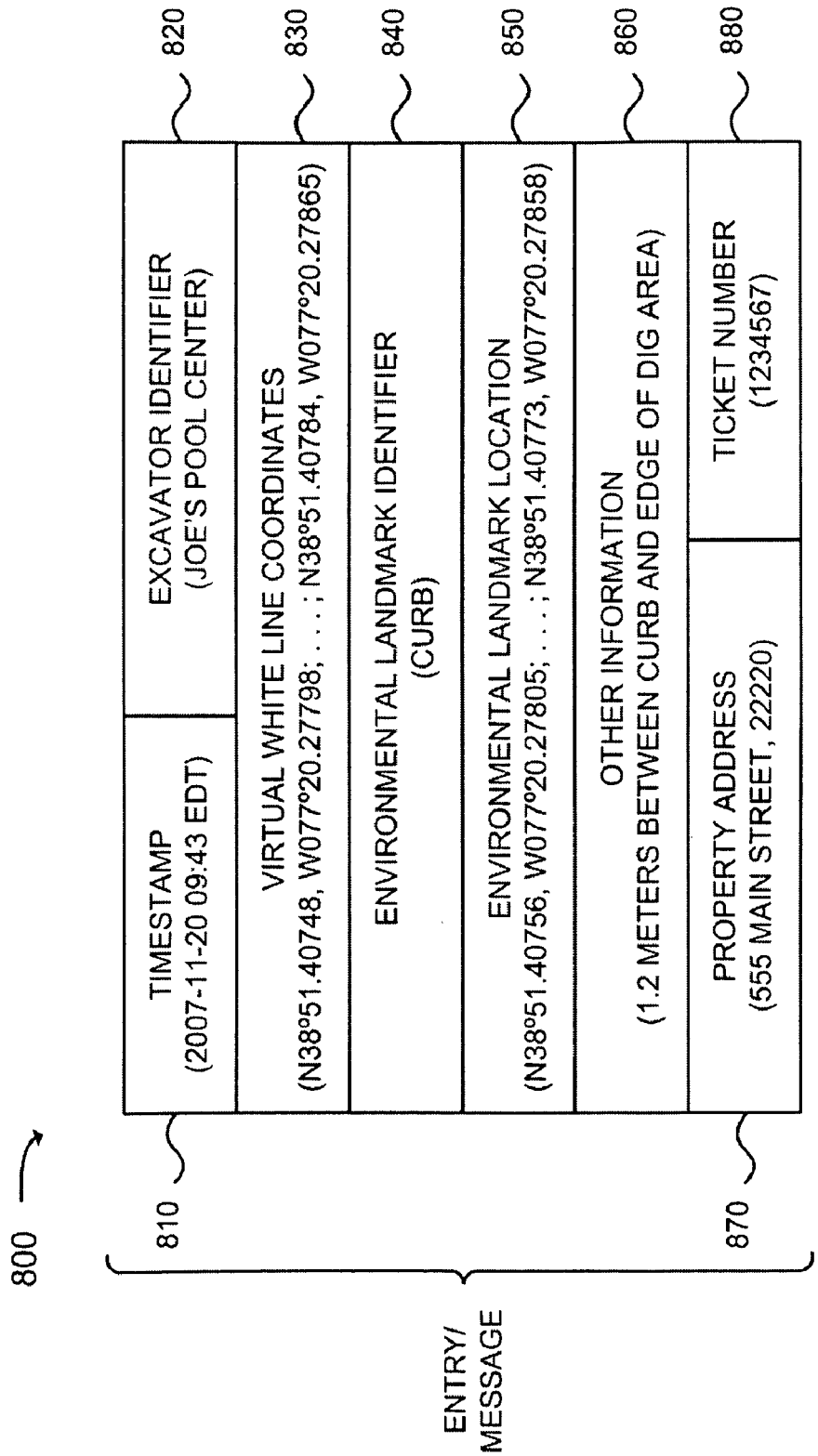
FIG. 8 is a diagram of an exemplary data set that may be stored in the memory of the central server of FIG. 4.

At FIG. 8, there is shown a diagram of an exemplary data set 800 that may be stored in memory 330 and/or transmitted to central server 220. Some of the information in data set 800 may be automatically populated by a software program on user device 210 or central server 220, such as the dig area marking tool application or a related application. As shown in FIG. 8, a data set 800 may include a timestamp field 810, an excavator identifier field 820, a dig area coordinates field 830, an environmental landmark identifier field 840, an environmental landmark location field 850, an other information field 860, a property address field 870, and a ticket number field 880. In another implementation, the data set 800 may include additional, fewer, or different fields.

Timestamp field 810 may include time data that identifies the day and/or time that the completed locate request was submitted. The time data in timestamp field 810 is shown in FIG. 8 as 9:43 a.m., Eastern Standard Time on Nov. 20, 2007—although any type of date and/or time code may be used. The information in timestamp field 810 may be useful in establishing when a locate request was initiated.

Excavator identifier field 820 may include an identifier that uniquely identifies the entity submitting the locate request. The identifier in excavator field 820 is shown in FIG. 8 as "Joe's Pool Center"—although any type of identifier may be used. Virtual white line coordinates field 830 may include geographic location information corresponding to the delimited dig area. In one implementation, the geographic location information may include a set of geographic points along the delimited dig area. The geographic location information in virtual white line coordinates field 830 is shown in FIG. 8 as N38°51.40748, W077°20.27798; . . . ; N38°51.40784, W077°20.27865—although any type of geographic location information may be used. The information in virtual white line coordinates field 830 may be useful in graphically presenting the dig area on a map, and/or to verify that the dig area was accurately delimited with physical white lines.

Environmental landmark identifier field 840 may include an identifier that uniquely identifies the type of environmental landmark being marked. The identifier in environmental landmark identifier field 840 is shown in FIG. 8 as "curb"—although any type of identifier may be used. Environmental landmark location field 850 may include geographic location information corresponding to the environmental landmark identified in environmental landmark identifier field 840. The geographic location information in environmental landmark location field 850 is shown in FIG. 8 as N38°51.40756, W077°20.27805; . . . ; N38°51.40773, W077°20.27858—although any type of geographic location information may be used.

Other information field 860 may store other data that may be useful, including user notes, such as distance information that identifies a distance between one or more environmental landmarks and one or more boundaries of the dig area. Other information field 860 is shown in FIG. 8 as including "1.2 meters between curb and edge of dig area"—although any other data may be used. Additionally and/or alternatively, other information field 860 may include audio/voice data, transcribed voice-recognition data or the like to incorporate such user notes.

Property address field 870 may be the property address associated with the dig area in the data set 800. Property address field 870 may include, for example, the street address and zip code of the property. Other information in field 870 may include city, state, and/or county identifiers. The ticket number field 880 may include the ticket number associated with the locate request, such as ticket number "1234567" shown in FIG. 8. In some implementations, the ticket number may not be known at the time the data set 800 is provided from user device 210 to central server 220; and, thus, ticket number 880 may be added to the data set 800 at a later time by central server 220.

In one implementation, central server 220 may store multiple data sets corresponding to a single dig area. User device 210 may provide the data sets to server 220 in a batch—such as a batch corresponding to a group of marks delimiting a single dig area—or individually. The batch may be grouped together with other information generally relating to the locate request, such as the name of the company responsible for performing the locate operation, the name or other identification information of the locate technician, and the like. Additionally, or alternatively, the other information generally relating to the locate operation may be included in each data set.

Figure 9:
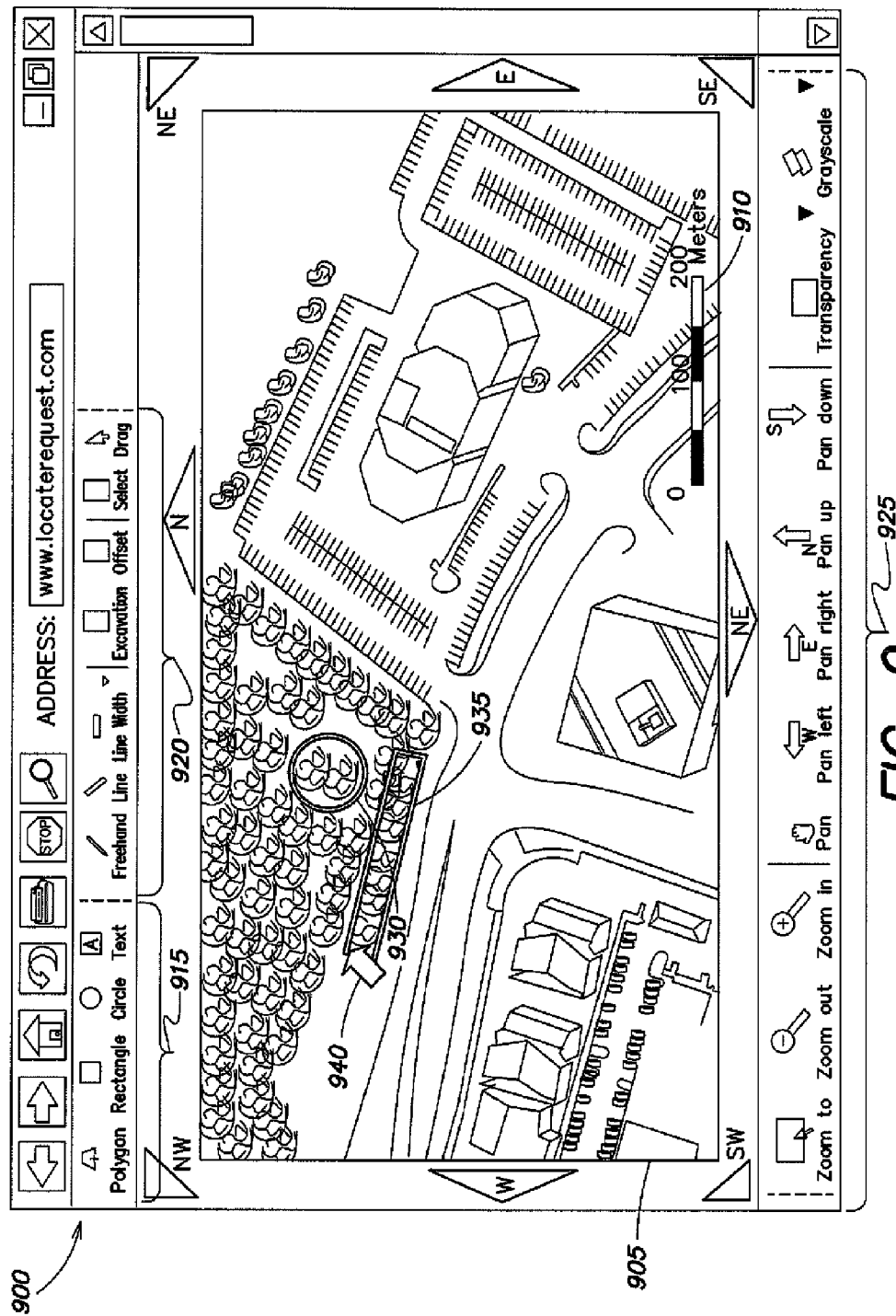
FIG. 9 is a diagram of an exemplary user interface that includes virtual white line marking tools that may be presented via a user device of FIG. 3.

Now turning to FIG. 9, an exemplary diagram of a user interface 340 that may be presented via the user device 210 is shown. User interface 900 may present an aerial image 905, along with a image scale 910 overlaying aerial image 905, and may also include various palettes, toolbars, or other interfaces that enable the user to manipulate (e.g., zoom in, zoom out) and/or mark up the aerial image. For example, user interface 900 may include a marking palette 915, a sketching palette 920, and a navigation palette 925. Marking palette 915 may group user interface buttons that the user can select (using, for example, the input device 340) in order to draw certain shapes (e.g., a polygon, a rectangle or a circle) or to orient or annotate the aerial image. Marking palette 915 may include a button (e.g., text button) that permits the user to add text boxes that can be used to add textual content for annotating the aerial image. Sketching palette 920 may group user interface buttons that the user can select in order to draw virtual white line shapes on aerial image 905. Sketching palette 920 may include, for example, a freehand button that permits the user to draw virtual white lines freehand, or a line button that permits the user to draw straight lines on aerial image 905. Navigation palette 925 may group user interface buttons that the user can select in order to zoom or pan the aerial image (e.g., zoom in, zoom out, zoom to, pan, pan left, pan right, pan up, pan down, etc.). Navigation palette 925 may additionally include one or more buttons that enable user drawn shapes to be accentuated (e.g., grayscale, transparency, etc.). The exemplary user interface 900 of FIG. 9 additionally depicts an example circular virtual white line 930 that has been drawn on aerial image 905. FIG. 9 also depicts an example rectangular virtual white line 935 being drawn on map 905 using a line cursor 940.

Aspects of the present disclosure as described herein enable a user (e.g., an excavator) to delimit a dig area when placing a locate request with, for example, a one-call center. A server at the one-call center may retrieve from a database the appropriate aerial image of a specific geographic location corresponding to a planned dig area where locate operations are to be conducted for underground facilities. The retrieved aerial image is provided to the user so that the user may draft, on the retrieved image, the approximate geographic boundaries of the planned dig area. The combination of the retrieved image and additional information drafted by the user may be saved in a variety of formats as virtual white lines. Other information regarding the specific geographic location of the dig area boundaries and environmental landmarks may be incorporated into the virtual white lines using direct input from GPS-enabled positioning tools and the like.

In other implementations, a user may interface directly with a facility owner to provide a virtual white line image—eliminating the involvement of the one-call center. In such an implementation, functionalities of the one-call center for enabling the user of virtual white lines may be assumed by the facility owner and/or the user.

Virtual white lines delimiting a dig area may serve several purposes. For example, virtual white lines as described herein may enhance excavators' safety and protect the general public from risks associated with damage to underground facilities by ensuring locate technicians receive clearly-communicated boundaries for their locate operations. Furthermore, virtual white lines may enhance the completeness of locate operations ensuring that excavators do not excavate where locates have not been performed. In addition, the virtual white lines may provide significant improvements in accuracy. In contrast, translation of textual descriptions of a dig area may be time consuming and imprecise. For example, a telephone-call to a one-call center may require an operator to transcribe an audible description of a planned dig area. The transcription may be eventually provided to a locate technician performing a locate operation of underground facilities. However, transcribed verbal descriptions of a location may lack precision, possibly communicating to a locate technician incorrect bounds of the dig area intended by the excavator, creating a significant risk of damage to underground facilities. As another benefit, virtual white lines as described herein may enable excavators to identify dig area boundaries with precision without being required to physically visit a dig area. Thus, an excavator may be able to save time and resources by eliminating certain trips to a dig area. Additionally, or alternatively, use of virtual white lines may provide for easier dissemination. Aerial images with virtual white lines can be associated with individual tickets and recalled electronically, avoiding the uncertainties and errors associated with manual filing systems.

The foregoing description is not intended to be exhaustive or to limit the description to the precise form disclosed. Modifications and variations are possible in light of the above disclosure or may be acquired from practice of the present disclosure.

For example, certain information has been described as being presented visually on a screen of user device 210. In other implementations, this information may be audibly provided to the user. In addition, particular information has been described as being input via an input device 340, such as a screen of user device 210. In other implementations, this information may be provided in other ways, such as by receiving inputs via input keys and/or buttons, by recognizing speech of the user, or by monitoring a condition of the user. More particularly, input device 340 may be capable of capturing signals that reflect a user's intent. For example, input device 340 may include a microphone that can capture a user's intent by capturing the user's audible commands. Alternatively, input device 340 may interact with a device that monitors a condition of the user, such as eye movement, brain activity, or heart rate.

As another example, certain components, such as user device 210 and central server 220 have been described as using an image cache. In other implementations, user device 210 and/or central server 220 may communicate with an image server (such as imager server 230) in real-time, so that no image cache may be required. In still other implementations, user device 210 may, for example, communicate in real time with central server 220.

In addition, implementations of FIG. 5 generally describes processes associating a one-call center with central server 220. In another implementation, facility owner 580 may provide a separate server to accomplish some of the routines of FIG. 5. For example, a facility owner may be informed by a one-call center of a locate request that includes only a textual description of a planned dig area. Facility owner 580 may separately contact the excavator (e.g., user) who placed the locate request and provide and conduct virtual white line procedures with the use from a separate server, later associating the virtual white lines with the other ticket information. In still other implementations, the user may conduct an initial locate request in two parts by providing a conventional locate request to a one-call center and then conducting a virtual white line process with a separate server operated by a facility owner 580.

As another example, it should be noted that reference to a GPS-enabled device is not limited to GPS systems only, and that any global navigation satellite system or other system that provides geo-spatial positioning may be used in implementations of the present disclosure.

In addition, while a series of blocks has been described with regard to FIGS. 6 and 7, the order of the blocks may be modified in other implementations. Further, non-dependent blocks may be performed in parallel.

Aspects, as described above, may be implemented in many different forms of software, firmware, and hardware in the implementations illustrated in the figures. The actual software code or specialized control hardware used to implement these aspects is not limiting of the description provided herein. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the present disclosure. In fact, many of these features may be combined in ways not specifically recited in the claims and/or disclosed in the specification.

No element, act, or instruction used in the present application should be construed as critical or essential to the present disclosure unless explicitly described as such. In addition, as used herein, the article "a" is intended to include one or more items. Where only one item is intended, the term "one" or similar language is used. Further, the phrase "based on" is intended to mean, "based, at least in part, on" unless explicitly stated otherwise.

What is claimed is:

1. A method for facilitating detection of a presence or an absence of at least one underground facility within a dig area, wherein at least a portion of the dig area may be excavated or disturbed during excavation activities, the method comprising:
    A) electronically receiving data representing an aerial image of a geographic area including the dig area, the data including geo-coding or geographical identification metadata associated with the aerial image;
    B) displaying at least a portion of the aerial image on a display device, wherein the displayed aerial image includes at least one map symbol, street name, region, and/or landmark description superimposed upon or displayed separately from the geographic area in the displayed aerial image;
    C) in advance of the excavation activities and at a first user location remote from the dig area, sketching virtual white lines to delimit the dig area on the displayed aerial image, via a user input device and a drawing application associated with the display device, so as to generate a marked-up digital image including a delimited dig area, the marked up digital image including the virtual white lines to precisely identify boundaries of the dig area; and
    D) electronically transmitting and/or electronically storing information relating to the marked-up digital image so as to facilitate the detection of the presence or the absence of the at least one underground facility within the dig area,
    wherein prior to A), the method comprises:
    providing non-image information to identify the dig area, wherein the non-image information comprises at least one of:
        a text description of the dig area;
        an address or a lot number of at least one property within which the dig area is located;
        a street intersection in a vicinity of the dig area;
        geographic coordinates associated with the dig area; and
        a designated geographic work area assigned to a first user at the first user location,
    and wherein A) comprises:
    A1) electronically receiving the data representing the aerial image based at least in part on the non-image information,
    and wherein prior to A1), the method comprises:
    calculating an image extent based at least in part on the non-image information so as to facilitate an identification of the aerial image of the geographic area including the dig area.

2. The method of claim 1, wherein prior to A), the method comprises:
    providing at least one of a log-in identifier and a password so as to enable at least A).

3. The method of claim 1, wherein prior to A1), the method comprises:
    selecting a source for the aerial image based at least in part on at least one of:
        a geographic coverage area of the source;
        an availability of the aerial image from the source;
        a desired resolution for the aerial image and an available resolution from the source;
        an age of the aerial image from the source; and
        a cost of the aerial image from the source.

4. The method of claim 1, wherein A) comprises receiving additional data representing a plurality of aerial images of the geographic area, and wherein B) comprises stitching together multiple aerial images of the plurality of aerial images so as to provide the displayed aerial image.

5. The method of claim 1, wherein C) comprises adding, via the user input device, at least one indicator to the displayed aerial image, wherein the at least one indicator comprises one or more of at least one line, at least one drawing shape, at least one shade, and at least one symbol.

6. The method of claim 1, wherein C) further comprises marking on the displayed aerial image at least one environmental landmark in the geographic area so as to generate the marked-up digital image.

7. The method of claim 1, wherein C) further comprises indicating at least one offset distance in the displayed aerial image between at least one environmental landmark in the geographic area and an edge of the dig area so as to generate the marked-up digital image.

8. The method of claim 7, wherein C) further comprises:
    automatically receiving geographic coordinates of the at least one environmental landmark; and
    automatically calculating the at least one offset distance based at least in part on the geographic coordinates of the at least one environmental landmark.

9. The method of claim 1, wherein C) is performed without acquiring geographic coordinates to delimit the dig area.

10. The method of claim 1, further comprising:
    determining from the marked-up aerial image a plurality of geographic coordinates representing the delimited dig area,
    wherein the information electronically transmitted and/or electronically stored in D) includes the plurality of geographic coordinates representing the delimited the dig area.

11. The method of claim 1, wherein the information electronically transmitted and/or electronically stored in D) comprises at least one of:
    the marked-up digital image;
    metadata associated with the marked-up digital image;
    a text description of the dig area;
    an address or a lot number of at least one property within which the dig area is located;
    a street intersection in a vicinity of the dig area;
    a date and/or time of day for an excavation of the dig area;
    a first identifier associated with an excavator to perform the excavation activities;
    a second identifier associated with at least one environmental landmark in the vicinity of the dig area;
    a time stamp associated with electronic transmission and/or storage; and
    a locate request ticket identifier.

12. The method of claim 1, wherein D) comprises transmitting an email and/or a link to a webpage including the information relating to the marked-up digital image to at least one party associated with a facility owner.

13. At least one non-transitory computer readable storage medium encoded with instructions that, when executed by at least one processing unit, perform a method for facilitating detection of a presence or an absence of at least one underground facility within a dig area, wherein at least a portion of the dig area may be excavated or disturbed during excavation activities, the method comprising:
- A) electronically receiving data representing an aerial image of a geographic area including the dig area, the data including geo-coding or geographical identification metadata associated with the aerial image;
- B) displaying at least a portion of the aerial image on a display device, wherein the displayed aerial image includes at least one map symbol, street name, region, and/or landmark description superimposed upon or displayed separately from the geographic area in the displayed aerial image;
- C) receiving user input, via a user input device associated with the display device and a drawing application associated with the display device, the user input representative of sketching virtual white lines to delimit the dig area on the displayed aerial image;
- D) generating a marked-up digital image including a delimited dig area, the marked up digital image including the virtual white lines to precisely identify boundaries of the dig area based on the user input; and
- E) electronically transmitting and/or electronically storing information relating to the marked-up digital image so as to facilitate the detection of the presence or the absence of the at least one underground facility within the dig area;

wherein prior to A), the method comprises:

providing non-image information to identify the dig area, wherein the non-image information comprises at least one of:
- a text description of the dig area
- an address or a lot number of at least one property within which the dig area is located;
- a street intersection in a vicinity of the dig area
- geographic coordinates associated with the dig area and
- a designated geographic work area assigned to a first user at the first user location, and wherein A) comprises:

A1) electronically receiving the data representing the aerial image based at least in part on the non-image information, and wherein prior to A1), the method comprises:

calculating an image extent based at least in part on the non-image information so as to facilitate an identification of the aerial image of the geographic area including the dig area.

14. An apparatus for facilitating detection of a presence or an absence of at least one underground facility within a dig area, wherein at least a portion of the dig area may be excavated or disturbed during excavation activities, the apparatus comprising:
- a communication interface;
- a display device;
- a user input device;
- a memory to store processor-executable instructions and a drawing application associated with the display device; and
- a processing unit coupled to the communication interface, the display device, the user input device, and the memory, wherein upon execution of the processor-executable instructions by the processing unit, the processing unit:
  - controls the communication interface to electronically receive data representing an aerial image of a geographic area including the dig area, the data including geo-coding or geographical identification metadata associated with the aerial image;
  - controls the display device to display at least a portion of the aerial image, wherein the displayed aerial image includes at least one map symbol, street name, region, and/or landmark description superimposed upon or displayed separately from the geographic area in the displayed aerial image;
  - in advance of the excavation activities and at the first user location remote from the dig area, acquires user input from the user input device, the user input representative of sketching virtual white lines via the drawing application to delimit the dig area on the displayed aerial image;
  - generates a marked-up digital image including a delimited dig area, the marked up digital image including the virtual white lines to precisely identify boundaries of the dig area based on the user input; and
  - further controls the communication interface and/or the memory to electronically transmit and/or electronically store information relating to the marked-up digital image so as to facilitate the detection of the presence or the absence of the at least one underground facility within the dig area;

wherein prior to A), the processing unit receives from the user input device non-image information to identify the dig area, wherein the non-image information comprises at least one of:
- a text description of the dig area
- an address or a lot number of at least one property within which the dig area is located;
- a street intersection in a vicinity of the dig area
- geographic coordinates associated with the dig area and
- a designated geographic work area assigned to a first user at the first user location, and wherein in A), the processing unit:

A1) receives the data representing the aerial image based at least in part on the non-image information, and wherein prior to A1), the processing unit:

calculates an image extent based at least in part on the non-image information so as to facilitate an identification of the aerial image of the geographic area including the dig area.

15. The apparatus of claim 14, further comprising a location identification unit to determine a geographic location of the apparatus.

16. The apparatus of claim 14, wherein the user input device includes at least one of a stylus, a mouse, a keyboard, a keypad, a touchpad, and a touch screen.

17. The apparatus of claim 14, wherein after acquiring user input from the user input device to delimit the dig area, the processing unit determines from the marked-up digital image a plurality of geographic coordinates representing the delimited dig area, and wherein the information electronically transmitted by the communication interface and/or electronically stored in the memory includes the plurality of geographic coordinates representing the delimited the dig area.

18. The apparatus of claim 14, wherein the information electronically transmitted by the communication interface and/or electronically stored in the memory comprises at least one of:
- the marked-up digital image;
- metadata associated with the marked-up digital image;
- a text description of the dig area;
- an address or a lot number of at least one property within which the dig area is located;

a street intersection in a vicinity of the dig area;
a date and/or time of day for an excavation of the dig area;
a first identifier associated with an excavator to perform the excavation activities;
a second identifier associated with at least one environmental landmark in the vicinity of the dig area;
a time stamp associated with electronic transmission and/or storage; and
a locate request ticket identifier.

* * * * *